(12) United States Patent
Webster

(10) Patent No.: US 6,683,124 B2
(45) Date of Patent: Jan. 27, 2004

(54) FLUORESCENT PIGMENT COMPOSITIONS

(75) Inventor: Joseph R. Webster, Charlotte, NC (US)

(73) Assignee: Clariant Finance (BVI) Limited, Tortola (VG)

( * ) Notice: Subject to any disclaimer, the term of this patent is extended or adjusted under 35 U.S.C. 154(b) by 118 days.

(21) Appl. No.: 09/965,689

(22) Filed: Sep. 27, 2001

(65) Prior Publication Data

US 2003/0111641 A1 Jun. 19, 2003

(51) Int. Cl.$^7$ ................................................. C08K 5/34
(52) U.S. Cl. ........................... 524/99; 524/90; 524/102; 524/103
(58) Field of Search ............................ 524/90, 99, 102, 524/103

(56) References Cited

U.S. PATENT DOCUMENTS

| | | | | |
|---|---|---|---|---|
| 3,969,302 A | * | 7/1976 | Wegmann et al. | 523/333 |
| 4,042,591 A | | 8/1977 | Kaul | 260/272 |
| 4,049,376 A | | 9/1977 | Le Pape | 8/162 R |
| 4,067,879 A | | 1/1978 | Vladuchick | 260/302 F |
| 4,153,618 A | | 5/1979 | Desai | 260/345.2 |
| 4,299,959 A | | 11/1981 | Desai | 544/283 |
| 4,335,155 A | | 6/1982 | Blake et al. | 426/565 |
| 4,405,749 A | | 9/1983 | Nelsen | 524/100 |
| 4,455,424 A | | 6/1984 | Kaul | 544/218 |
| 4,528,311 A | | 7/1985 | Beard et al. | 524/91 |
| 4,911,830 A | | 3/1990 | Bromley et al. | 252/301.16 |
| 4,975,220 A | | 12/1990 | Streitel et al. | 252/301.35 |
| 5,051,459 A | | 9/1991 | Slongo et al. | 524/100 |
| 5,094,777 A | | 3/1992 | DiPietro | 252/301.35 |
| 5,236,621 A | | 8/1993 | DiPietro | 252/301.35 |
| 5,278,216 A | | 1/1994 | Asanuma et al. | 524/394 |
| 5,294,664 A | | 3/1994 | Morrison, Jr. et al. | 524/560 |
| 5,439,968 A | | 8/1995 | Hyche | 524/504 |
| 5,439,971 A | | 8/1995 | Hyche | 524/763 |
| 5,470,921 A | | 11/1995 | Kaul et al. | 525/432 |
| 5,880,176 A | | 3/1999 | Kamoto et al. | 523/172 |
| 5,932,353 A | | 8/1999 | Huarng et al. | 428/423.5 |
| 5,932,640 A | | 8/1999 | Kaul et al. | 524/102 |
| 5,965,261 A | | 10/1999 | Webster | 428/364 |
| 5,969,014 A | | 10/1999 | Webster et al. | 524/100 |
| 5,989,453 A | | 11/1999 | Marcq et al. | 252/301.35 |
| 6,110,566 A | | 8/2000 | White et al. | 428/172 |

FOREIGN PATENT DOCUMENTS

| WO | WO 97/43335 | 11/1997 |
|---|---|---|

OTHER PUBLICATIONS

CAS Registry No. 56279–27–7.
CAS Registry No. 1047–16–1.
CAS Registry No. 18600–59–4.
CAS Registry No. 23949–66–8.
CAS Registry No.: 35001–52–6.
CAS Registry No.: 82493–14–9.
CAS Registry No.: 67845–93–6.
CAS Registry No.: 4221–80–1.
CAS Registry No.: 1843–05–6.
CAS Registry No.: 7443–25–6.
CAS Registry No.: 6337–43–5.
CAS Registry No.: 96478–09–0.
CAS Registry No.: 103597–45–1.
CAS Registry No.: 2725–22–6.
CAS Registry No.: 42774–15–2.
CAS Registry No.: 980–26–7.
CAS Registry No.: 3089–17–6.
CAS Registry No.: 3573–01–1.
CAS Registry No.: 6197–30–4.
CAS Registry No.: 147783–69–5.
CAS Registry No.: 137759–38–7.
CAS Registry No.: 65816–20–8.
CAS Registry No.: 57834–33–0.
Polyamides (General), vol. 19, pp. 454–584.
Industrial Organic Pigments, W. Herbst, K. Hunger, 1993; p. 8, 447, 456–460.
Patent Abstract for JP 4141025.
Patent Abstract for WO/9012839.
Patent Abstract for JP 3047846.
Patent Abstract for AU 9054330.
Patent Abstract for ZA 7101224.
Patent Abstract for BR 7606930.
Patent Abstract for JP 01111075.
Patent Abstract for CA 1064500; BR 7607075; AU 7618915; AU 501592.
127:249416 CA.
93:16869 CA.
90:105588 CA.
90:24765 CA.
89:25173 CA.
87:152853 CA.

* cited by examiner

*Primary Examiner*—Kriellion A. Sanders
(74) *Attorney, Agent, or Firm*—Anthony A. Bisulca

(57) ABSTRACT

Fluorescent yellow pigment compositions comprising Pigment Violet 19 or Pigment Yellow 192 and a polyamide, a process for the making thereof, and a process for making an article comprising said fluorescent yellow pigment composition.

72 Claims, 19 Drawing Sheets

FLUORESCENT PIGMENT COMPOSITIONS

FIELD OF THE INVENTION

The present invention relates to fluorescent pigment compositions and processes for the making thereof. The present invention also relates to articles formed from the fluorescent pigment compositions.

BACKGROUND OF THE INVENTION

It is generally known that fluorescent pigments are often referred to as daylight fluorescent colors. The term pigment in this context is inaccurate since by definition a pigment is understood to mean a pure unextended inorganic or organic colorant that, unlike a dye, is insoluble in all types of solvents. However, most daylight fluorescent colors are not truly pigments but really solid solutions of fluorescent dyes in transparent synthetic resins that are finely ground to a particle size in the range of 2 to 5 microns. These pigments can alternatively be described as transparent plastic materials colored with fluorescent dyes. Polyamides may be used as carrier materials for these compositions. Unlike conventional organic pigments, which are usually precipitated single components, fluorescent pigments are solid state solutions of common fluorescent dyes in polymeric resins or matrices.

The daylight fluorescent colors belong to the dye families known as rhodamines, fluoresceins, coumarins, naphthalimides, benzoxanthenes and acridines. Typical dyes include Basic Red 1, Basic Violet 10, Basic Violet 11, Basic Violet 16, Basic Yellow 40, Solvent Yellow 44, Solvent Yellow 131 and Solvent Yellow 135. The fluorescent dyes comprise from about 0.1 to about 15% of the total weight of the pigment.

U.S. Pat. No. 4,153,618 and U.S. Pat. No. 4,299,959 disclose a fluorescent pigment consisting of N-substituted iminocoumarins.

U.S. Pat. No. 4,911,830 discloses low plate-out fluorescent pigment concentrates that are of the daylight fluorescent color type.

U.S. Pat. No. 4,975,220 discloses a fluorescent pigment composition comprising a fluorescent dye combined in a polyamide-polyester thermoplastic resin.

U.S. Pat. No. 5,094,777 discloses a fluorescent composition including a fluorescent dye and a resin carrier. The fluorescent dye is of the daylight fluorescent-type and belongs to the dye families known as rhodamines, fluoresceins, coumarins, naphthalimides, benzoxanthenes, and acridines.

U.S. Pat. No. 5,236,621 discloses a thermoplastic organic fluorescent pigment that unlike conventional organic pigments is a solid state solution of fluorescent dyes. The fluorescent pigment includes from 85 to 99 weight percent polymer matrix and from 1 to 15 weight percent fluorescent dye, the weight percent being based on the combined weight of the polymer matrix and dye.

U.S. Pat. No. 5,294,664 discloses an aqueous dispersion of a fluorescent pigment comprising a water insoluble polymer, fluorescent dye, emulsifiers, and water. The fluorescent pigment which is suitable for use as an ink in thin film printing has an average particle size of from about 0.01 to about 1 microns, and the fluorescent pigment which is suitable for use as either a pigment suspension or a dry fluorescent pigment has a particle size up to 10 microns.

U.S. Pat. No. 5,439,971 discloses a low plate-out fluorescent pigment of the daylight fluorescent-type. The low plate-out fluorescent pigment comprises a pigment comprising a polymer selected from the group consisting of polyesters, melamine-formaldehyde resins and triazine-formaldehyde resins and a fluorescent dye, and a copolymer of ethylene and carbon monoxide. The copolymer has a molecular weight of about 1,000 to about 100,000, the copolymer containing carbon monoxide residue in the amount of about 5 to 30% by weight and the copolymer being in sufficient amount to disperse the pigment.

U.S. Pat. No. 6,110,566 discloses a colored article having fluorescent properties comprising a substantially solventless polyvinyl chloride matrix, a thioxanthene fluorescent dye, and a secondary or tertiary hindered amine light stabilizer having a molecular weight less than about 1000 grams/mole.

Unlike the fluorescent pigment compositions known above, the fluorescent pigment compositions of the present invention comprise true pigments. Surprisingly, in the present invention when either Pigment Violet 19 or Pigment Yellow 192 is used in an effective amount in a polyamide, with or without the presence of other additives, the result is a bright fluorescent yellow polymeric pigment composition.

Pigment Yellow 192 (CAS Registry No. 56279-27-7; TSCA Inventory Name: 7H,11H-Benz[de]imidazo[4',5':5,6]benzimidazo[2,1-a]isoquinoline-7,11-dione, 10,12-dihydro-) is a polycyclic pigment having the following structure:

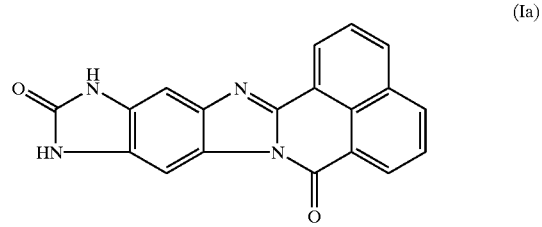

(Ia)

Pigment Yellow 192 is not known to fluoresce in polyamides.

Pigment Violet 19 (CAS Registry No. 1047-16-1; TSCA Inventory Name: Quino[2,3-b]acridine-7,14-dione, 5,12-dihydro) is a quinacridone pigment having the following structure:

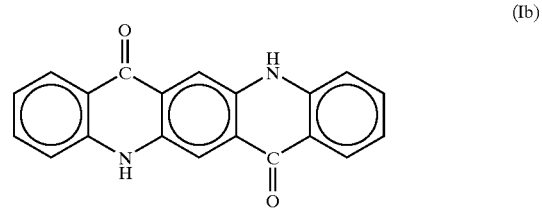

(Ib)

Pigment Violet 19 is known to have a range of shades from red-violet to bluish red and is not known to fluoresce. Quinacridones are not typically recommended for use in polyamides. This is generally because of poor dispersion and also because of burn out in nylon. The term "burn out" refers to the situation in which the thermal stability of the colorant is compromised. For example, there may be coloration changes. Polyamide fibers are characterized by high tensile strength, modulus and abrasion resistance; however, polyamides require stabilization against thermo-oxidative and photodegradation for demanding use applications. Therefore, further improvement in the stabilization systems for these materials is presently desired in such end uses as engineering resins, films, coatings, adhesives, plastics, fibers, monofilaments and nonwovens. Polyamides are also suitable in relatively high temperature processing of injection moldings. The polyamide structure contains labile hydrogens and exerts reductive or basic properties which are problematic from the standpoint of colorants. For example, in polyamide, an organic dye may undergo a significant loss of shade upon thermal processing at the typical melt processing temperatures for polyamide. It would be desirable to lessen the tendency of polyamide to exert this influence on dyes without sacrificing the desired physical properties of polyamides. One aspect of the present invention is directed to additives which are dispersed within the polyamide polymer by melt-processing at high temperatures above the glass transition, as in extrudates or moldings. It was unexpected to achieve fluorescent yellow pigment compositions for use in applications such as polyamide fibers or molded articles that have the advantageous properties of the present invention.

Currently, industry relies upon expensive fluorescent pigments and optical brighteners that are more on the green or blue side of the visible spectrum. Yellow fluorescent pigments are extremely expensive, require ultraviolet protection, and are difficult to disperse. Thus, there is a need for fluorescent pigment compositions such as in the present invention that are cost effective and easy to disperse yet are fluorescent in the yellow region of the electromagnetic visible spectrum.

SUMMARY OF THE INVENTION

It is an object of the present invention to provide a fluorescent yellow pigment composition comprising an effective amount of Pigment Violet 19 and a polyamide. The fluorescent composition may be in the form of an article, such as a molded, cast, or extruded article. It is another object of the present invention to provide a fluorescent yellow pigment composition comprising an effective amount of Pigment Yellow 192 and a polyamide. The fluorescent composition may be in the form of an article, such as a molded, cast, or extruded article. It is yet another object of the present invention to provide a fluorescent yellow pigment composition comprising a compound of the formula

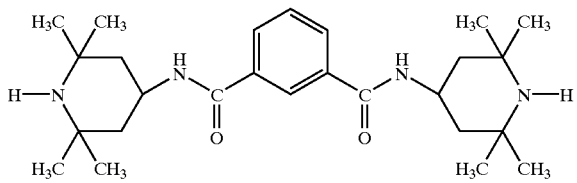

with enhanced fluorescence.

It is another object of the present invention to provide processes for making fluorescent yellow pigment compositions. In one embodiment of the present invention, the pigment is added to a carrier material to form a single pigment concentrate or masterbatch. The single pigment concentrate or masterbatch can also be enhanced by the addition of a compound of the formula

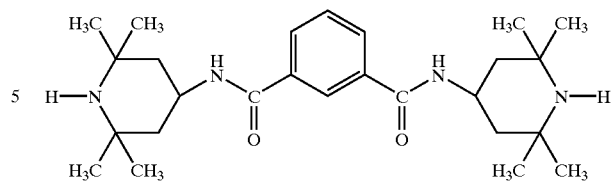

Other additives may also be present in the single pigment concentrate or masterbatch.

It is yet another object of the present invention to provide a fluorescent article.

DESCRIPTION OF THE PREFERRED EMBODIMENTS

Figure 1:
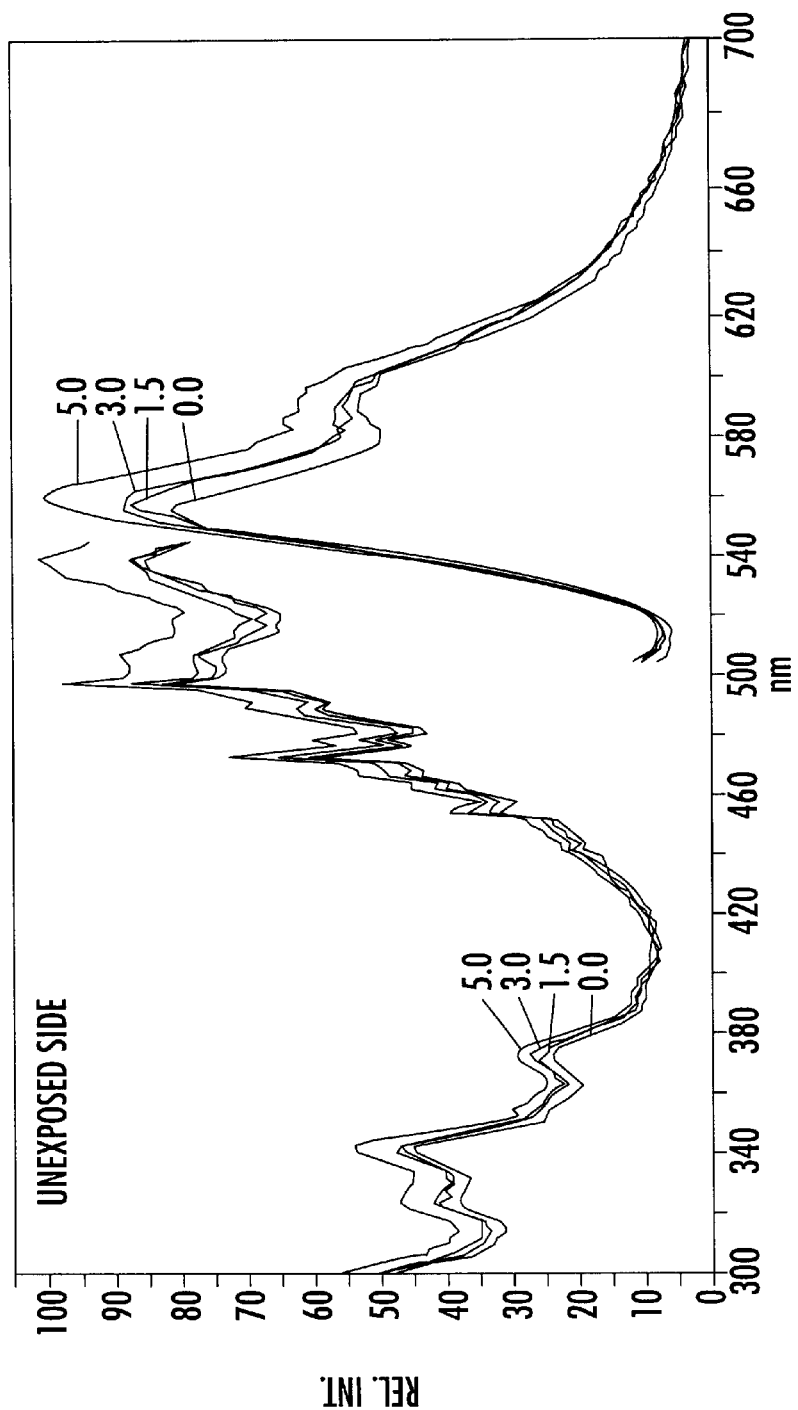
FIG. 1 is a graph of wavelength in nanometers (nm) versus relative intensity which illustrates the exposure and non-exposure to ultraviolet light of card wraps of polyamide fiber comprising 0.1% by weight of Pigment Violet 19 and NYLOSTAB® S-EED™ at levels of 0%, 1.5%, 3% or 5%, by weight.

Pigment Violet 19 and Pigment Yellow 192 are pigments that can be used in effective amounts to produce the fluorescent pigment compositions of the present invention. Pigment Yellow 192 (CAS Registry No. 56279-27-7; TSCA Inventory Name: 7H,11H-Benz[de]imidazo[4',5':5,6] benzimidazo[2,1-a]isoquinoline-7,11-dione, 10,12-dihydro-) is a polycyclic pigment having the following structure:

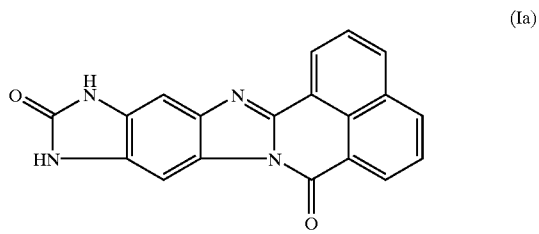

(Ia)

Pigment Yellow 192 is not known to fluoresce in polyamides.

Pigment Violet 19 (CAS Registry No. 1047-16-1; TSCA Inventory Name: Quino[2,3-b]acridine-7,14-dione, 5,12-dihydro) is a quinacridone pigment having the following structure:

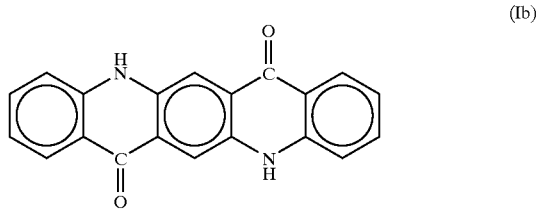

(Ib)

Pigment Violet 19 is known to have a range of shades from red-violet to bluish red and is not known to fluoresce. The pigments employed in the present invention achieve fluorescence in the polyamide composition of the present invention when present in an effective amount of less than 1.0% by weight based upon the weight of the polyamide. The effective amount of the pigment is preferably from about 0.005% to 0.25% by weight based on the weight of the polyamide. The amount of pigment employed is most preferably from about 0.01% to 0.15% by weight based on the weight of the polyamide.

The term "polyamide" as used in the context of the present invention includes the synthetic aliphatic polyamide, semi-aromatic polyamide, aromatic polyamides, polyamide-polyester blends, and polyether blocked amides (i.e. transparent nylons). The polyamides of the present invention can be prepared by direct amidation, acid chloride reaction, ring-opening polymerization or other conventional methods. Polyamides of aromatic diamines and aliphatic diacids can also be prepared by the reaction of the corresponding aromatic diisocyanate and diacids. Examples of polyamides suitable for use in the present invention include, but are not limited to, nylon 6; nylon-6,6; nylon-6,9; nylon-6,10; nylon-6,11; nylon-6,12; nylon 4,6; nylon 11; nylon 12; nylon 12,12; nylon 13; nylon 13,13; and copolymers such as nylon-6,6/6; nylon-6,6/6,10; nylon 6/11; nylon 6/12; blends of polyamides such as nylon-6,6 or nylon 6 with syndiotactic polystyrene; and copolymers of polyamides such as nylon-6,T/6,I/6,6; nylon-6,T/6,6; nylon-6,T/D,T; nylon-6,T/6; nylon-6, T/6,I; block copolymers such as polyether-polyamide block copolymers, poly(m-phenyleneisophthalamide), poly(p-phenyleneterephthalamide); random copolymers; and graft copolymers. Manufacturers of such polyamides include Amoco, BASF, DSM, E.I. dupont, Mitsui, Honeywell, Mohawk, Monsanto, Shaw Industries, Akzo, Bayer, Elf Autochem, Rhodia, Nyltech, Shakespeare, Solutia, and Beaulieu of America, Inc.

The term "polyamide" also includes formulated polyamides such as conventional impact toughened polyamide and reinforced polyamide containing glass fiber, mineral or glass/mineral combinations. The present invention can be practiced with polyamides regardless of the polymer morphology. Amorphous, semi-crystalline or highly crystalline polyamides as well as blends of different crystallinity are benefited. The fibers may also be in a bicomponent or biconstituent form. Among the sources for commercially available polyamide resins are BASF, DSM, and E.I. duPont. Formulated polyamides are commercially available from Ferro Corporation, Hanna Engineered Materials, Huls America, and A. Schulman. Reinforced polyamides are commercially available from suppliers such as DSM RIM Nylon.

Preferred polyamides include homopolyamides and/or copolyamides made from ω-aminocaproic acid, ω-aminoetanthoic acid, ω-aminocaprylic acid, ω-aminopelargonic acid, ω-aminocapric acid, ω-aminoundecanoic acid, ω-aminolauric acid, caprolactam, lactam-7, lactam-8, lactam-9, lactam-10, lactam-11 and/or laurolactam. Preferred polyamides also include polyamides made from dimethylenediamine, trimethylenediamine, tetramethylenediamine, pentamethylenediamine, hexamethylenediamine, polyetherdiamine and mixtures thereof as well as oxalic acid, malonic acid, succinic acid, glutaric acid, adipic acid, pimelic acid, suberic acid, azelaic acid, sebacic acid, nonedicarboxylic acid, decanedicarboxylic acid, undecanedioic acid, dodecanedioic acid, dimerised fatty acids and mixtures thereof.

Conventional additives may optionally be present in the polyamide. Such additives include, but are not limited to, delusterants such as titanium dioxide, antioxidants including primary and secondary, antistats, antimicrobial agents, flame retardants, waxes, dispersing aides, ultraviolet ("UV") stabilizers such as from the hindered amine light stabilizer (HALS) family, UV absorbers, thermal stabilizers, light stabilizers, lubricants, pigments, reinforcing and or non-reinforcing fillers.

Primary and secondary antioxidants are suggested for inclusion herein at conventional amounts. Antioxidants include, for example, alkylated monophenols, alkylated hydroquinones, alkylidenebisphenols, hindered alkyl benzyl compounds, acylaminophenols, esters of β-(3,5-di-tert-butyl-4-hydroxyphenyl)propionic acid, and the like which are disclosed in U.S. Pat. No. 5,051,459 incorporated herein by reference. A commercially available antioxidant is IRGANOX® 1098 from Ciba Specialty Chemicals.

As stated above, UV absorbers may be included in the compositions of the present invention. These UV absorbers may be of both the volatile and low volatile types. These UV absorbers include, but are not limited to, the class of hydroxy-substituted benzotriazoles, non-hydroxy substituted oxanilides, hydroxy substituted benzophenones, hydroxy substituted triazines, p-methoxy benzylidene malonate esters, hindered amines including cell photoreactive hindered amines, hydroxy substituted hindered benzoates, and non-hydroxy substituted benzoxazinones.

Non-hydroxy substituted benzoxazinones that may be used include, but are not limited to, 2,2'-(1,4-phenylene)bis [4H,3,1-benzoxazin-4-one (ENCS Inventory Name) (CAS Registry No. 18600-59-4) which is commercially available as CYASORB® UV 3638 from Cytec Industries.

Oxanilides that may be used include, but are not limited to, ethanediamide, N-(2-ethoxyphenyl)-N'-(2-ethylphenyl) (TSCA Inventory Name) (CAS Registry No. 23949-66-8) which is commercially available as SANDUVOR® VSU from Clariant and TINUVIN® 312 from Ciba Specialty Chemicals. Another oxanilide is ethane diamide, N-[5-(1,1-dimethylethyl)-2-ethoxyphenyl]-N'-(2-ethylphenyl) (TSCA Inventory Name) (CAS Registry No. 35001-52-6) which is commercially available as SANDUVOR® EPU from Clariant and TINUVIN® 315 from Ciba Specialty Chemicals. Another oxanilide that may be used is ethanediamide, N-(2-ethoxyphenyl)-N'-(4-isododecylphenyl) (DSL Inventory Name) (CAS Registry No. 82493-14-9) which is commercially available as SANDUVOR® 3206 from Clariant.

A hindered benzoate UV absorber that may be used is benzoic acid, 3,5-bis(1,1-dimethylethyl)-4-hydroxy, hexadecyl ester (TSCA Inventory Name) (CAS Registry No. 67845-93-6) commercially available as CYASORB® 2908 from Cyanamid. Another hindered benzoate UV absorber that may be used is benzoic acid, 3,5-bis(1,1-dimethylethyl)-4-hydroxy-, 2,4-bis(1,1-dimethylethyl)phenyl ester (TSCA Inventory Name) (CAS Registry No. 4221-80-1) which is commercially available as FERRO® AM 340 from Ferro Corp.

A benzophenone that may be used is methanone, [2-hydroxy-4-(octyloxy)phenyl]phenyl (TSCA Inventory Name) (CAS Registry No. 1843-05-6) which is a broad UV absorber that absorbs UV radiation from 290 to 390 nm and is commercially available from Clariant as SANDUVOR® 3035.

A benzylidene malonate that may be used is propanedioic acid, [(4-methoxyphenyl)methylene]-, dimethyl ester (TSCA Inventory Name) (CAS Registry No. 7443-25-6). This particular UV absorber is commercially available from Clariant as SANDUVOR® PR 25. Also, another compound that may be used is tetraethyl 2,2'-(1,4-phenylenedimethylidyne)-bismalonate (CAS Registry No. 6337-43-5).

Examples of benzotriazoles include, but are not limited to, 2-(2'-hydroxphenyl)benzotriazoles, 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-[2'-hydroxy-5'-(1,1,3,3-tetramethylbutyl)phenyl]benzotriazole, 2-(3'-5'-di-tert-butyl-2'-hydroxyhenyl)-5-chlorobenzotriazole, 2-(3'tert-butyl-2'-hydroxy-5'-methylphenyl)-5-chlorobenzotriazole, 2-(3'-sec-butyl-5'-tert-butyl-2'-hydroxyphenyl) benzotriazole, 2-(2'-hydroxy-4'-octoxyphenyl) benzotriazole, 2-(3',5'-di-tert-amyl-2'-hydroxy-phenyl) benzotriazole, 2-(3',5'-bis(ΘΘ.dimethylbenzyl)-2'hydroxyphenyl)benzotriazole; mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methyxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-(2-octyloxy-carbonylethyl)phenyl)benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)-benzotriazole, and 2-(3'-tert-butyl-2'-hydroxy-5'-(2-isooctylocycarbonylethyl) phenylbenzotriazole, 2,2'-methylenebis[4-(1,1,3,3-tetramethylbutyl)-6-benzotriazol-2-ylphenol]; transesterification product of 2-[3'-tert-butyl-5'(2-methoxycarbonylethyl)-2'-hydroxyphenyl]benzotriazole with polyethylene glycol 300; [R—$CH_2CH_2$—COO($CH_2$) $_3]_2$ where R=3'-tert-butyl-4'-hydroxy-5'–2H-benzotriazol-2-ylphenyl; [R—$CH_2CH_2$—COO($CH_2CH_2O)_{N/2}]_2$ where n=1 to 5 and R-3'-tert-butyl-4'hydroxy-5'–2H-benzotriazol-2-ylphenyl. A benzotriazole that may be used is 2-propenoic acid, 2-methyl-, 2-[3-(2H-benzotriazol-2-yl)-4- hydroxyphenyl]ether ester (TSCA Inventory Name) (CAS Registry No. 96478-09-0) which is commercially available as NORBLOC® 7966, and NORBLOC® 6000, from Jensen Pharma., Inc. Other suitable benzotriazoles such as 2,2'-metlhylene bis(6-(2H-benzotriazol-2-yl)-4-(1,1,3,3-tetramethylbutyl)phenol (CAS No. 103597-45-1) and related UV dimers are commercially available as TINUVIN® 360 from Ciba Specialty Chemicals, MIXXIM® BB100 from Fairmont Chemical Company, LA31 or ADA LA31 or Mark LA31 from Adeka Argus or Witco Chemical. Benzotriazoles are disclosed in U.S. Pat. Nos. 4,335,155, 4,405,749, and 4,528,311, that are incorporated herein by reference. The present invention not only includes benzotriazole dimers such as TINUVIN® 360 but also includes dimers of benzophenones, and dimers of benzophenone:benzotriazole.

Examples of triazines include, but are not limited to, 2-(2-hydroxyphenyl)-1,3,5-triazines, 2,4,6-tris(2-hydroxy-4-octyloxyphenyl)-1,3,5-triazine, 2-(2-hydroxy-4-octyloxyphenyl)-4,6-bis-(2,4-dimethylphenyl)-1,3,5-triazine, 2-(2,4-dihydroxyphenyl)-4,6-bis-(2,4-dimethylphenyl)-1,3,5-triazine, 2-(2,4-dihydroxyphenyl)-4,6-bis-(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2,-(2-hydroxy-4-dodecycloxyphenyl)4,6-bis(2,4-dimethylphenyl)-1,3,5-triazine, 2-[2-hydroxy-4-(2-hydroxy-3-butyloypropyloxy)phenyl]-4,6-bis(2,4-dimethylphenyl)-1,3,5-triazine, 2-(4,6-diphenyl-1,3,5-triazin-2-yl)-5[(hexyl)oxy]phenol, and 2-hydroxy-4-(2-hydroxy-3-octyloxypropylocy)-phenyl]-4,6-bis(2,4-dimethylphenyl)-1,3,5-triazine. Another triazine that may be used is phenol, 2-[4,6-bis(2,4-dimethylphenyl)-1,3,5-triazin-2-yl]-5-(octyloxy-)- (TSCA Inventory Name) (CAS Registry No. 2725-22-6) which is commercially available as CYASORB® 1164, from Cytec Industries (formerly American Cyanamid). Other commercially available triazines include TINUVIN® 1577, TINUVIN® 1545, and TINUVIN® 400, commercially available from Ciba Specialty Chemicals.

A preferred additive compound for use in an effective amount in the composition of the present invention is a compound of the general formula:

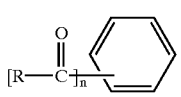

(II)

wherein n=1, 2, 3 or 4, the carbonyl group(s) is (are) in any position on the heterocyclic ring, and R is a sterically hindered amino group adjacent to the carbonyl carbon.

Where n=2, the preferred compound is a compound having the formula:

wherein the carbonyl groups are in any position on the heterocyclic ring and at least one R group represents a sterically hindered amino group adjacent to the carbonyl carbon. Preferably each R group is a sterically hindered amino group.

Preferred R groups include, but are not limited to, the following:

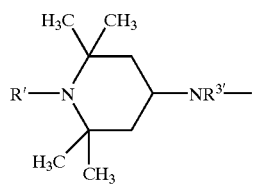

(III)

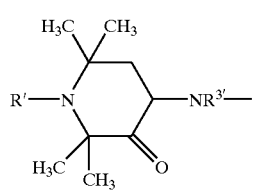

(IV)

wherein for either formula (III) or (IV), R' is independently either hydrogen, $C_1$–$C_{20}$ alkyl, O, OH, $CH_3$, CN, an acetyl group, $C_1$–$C_{18}$ alkoxy, alkoxyalkylenoxyalky, $C_5$–$C_{12}$ cycloalkoxy, $C_3$–$C_6$ alkenyl, $C_7$–$C_9$ phenylalkyl unsubstituted or mono-, di- or tri-substituted on the phenyl by $C_1$–$C_4$ alkyl; or aliphatic or aromatic $C_1$–$C_{10}$ acyl, —$COR^{4'}$ (where $R^{4'}$ is hydrogen, $C_1$–$C_6$ alkyl, phenyl, and —$C_1$–$C_{20}$ COO(H or $C_1$–$C_4$ alkyl)), $C_1$–$C_{20}$ alkylamino, optionally further substituted $C_1$–$C_{20}$ alkoxyalkyl, $C_1$–$C_{20}$ hydroxyalkyl, $C_1$–$C_{20}$ alkenyl, substituted $C_1$–$C_{20}$ alkenyl groups, $C_1$–$C_{20}$-alkoxy-$C_1$–$C_{20}$-alkyl groups, $C_1$–$C_{20}$-oxy-N—$C_1$–$C_{20}$-alkyl groups, —N-cyclic-$C_1$–$C_{10}$-alkyl groups, and cyclic-N—$C_1$–$C_{10}$-alkyl groups-$COR^{4'}$ (where $R^{4'}$ is hydrogen, $C_1$–$C_6$ alkyl, phenyl, and —$C_1$–$C_{20}$ COO(H or $C_1$–$C_4$ alkyl)); $R^{3'}$ is hydrogen or $C_1$–$C_8$ alkyl.

Preferred members of the class of compounds according to the formula (II) include compounds of the formulae (V), (VI), (VII) and (VIII), wherein R is a sterically hindered amino group adjacent to the carbonyl carbon.

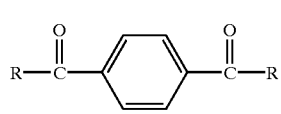

(V)

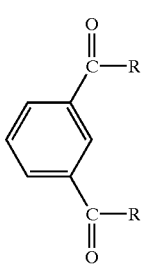

(VI)

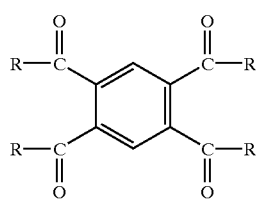

(VIII)

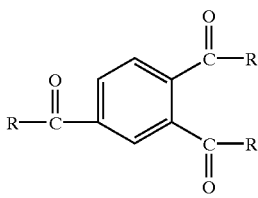
(VII)

A preferred aromatic dicarbonyl compound is a compound having the formula (IX):

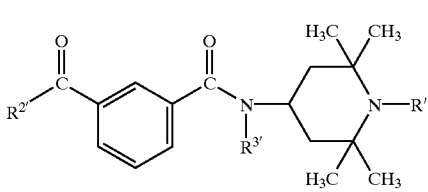
(IX)

wherein R' and R$^{2'}$ are independently either hydrogen, C$_1$–C$_{20}$ alkyl, O, OH, CH$_3$, CN, an acetyl group, C$_1$–C$_{18}$ alkoxy, alkoxyalkylenoxyalky, C$_5$–C$_{12}$ cycloalkoxy, C$_3$–C$_6$ alkenyl, C$_7$–C$_9$ phenylalkyl unsubstituted or mono-, di- or tri-substituted on the phenyl by C$_1$–C$_4$ alkyl; or aliphatic or aromatic C$_1$–C$_{10}$ acyl, —COR$^{4'}$ (where R$^{4'}$ is hydrogen, C$_1$–C$_6$ alkyl, phenyl, and —C$_1$–C$_{20}$ COO(H or C$_1$–C$_4$ alkyl)), C$_1$–C$_{20}$ alkylamino, optionally further substituted C$_1$–C$_{20}$ alkoxyalkyl, C$_1$–C$_{20}$ hydroxyalkyl, C$_1$–C$_{20}$ alkenyl, substituted C$_1$–C$_{20}$ alkenyl groups, C$_1$–C$_{20}$-alkoxy-C$_1$–C$_{20}$-alkyl groups, C$_1$–C$_{20}$-oxy-N—C$_1$–C$_{20}$-alkyl groups, —N-cyclic-C$_1$–C$_{10}$-alkyl groups, and cyclic-N—C$_1$–C$_{10}$-alkyl groups-COR$^{4'}$ (where R$^{4'}$ is hydrogen, C$_1$–C$_6$ alkyl, phenyl, and —C$_1$–C$_{20}$ COO(H or C$_1$–C$_4$ alkyl)); R$^{3'}$ is hydrogen or C$_1$–C$_8$ alkyl.

More preferred is the aromatic dicarbonyl compound (X):

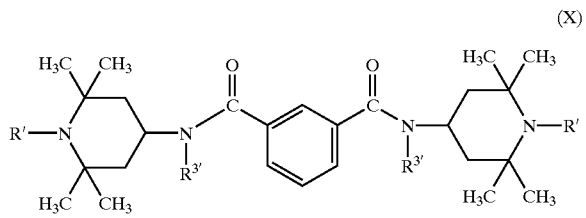
(X)

wherein each R' is independently hydrogen, C$_1$–C$_{20}$ alkyl, O, OH, CH$_3$, CN, an acetyl group, C$_1$–C$_{18}$ alkoxy, alkoxyalkylenoxyalky, C$_5$–C$_{12}$ cycloalkoxy, C$_3$–C$_6$ alkenyl, C$_7$–C$_9$ phenylalkyl unsubstituted or mono-, di- or tri-substituted on the phenyl by C$_1$–C$_4$ alkyl; or aliphatic or aromatic C$_1$–C$_{10}$ acyl, —COR$^{4'}$ where R$^{4'}$ is defined as above, C$_1$–C$_{20}$ alkylamino, optionally further substituted C$_1$–C$_{20}$ alkoxyalkyl, C$_1$–C$_{20}$ hydroxyalkyl, C$_1$–C$_{20}$ alkenyl, substituted C$_1$–C$_{20}$ alkenyl groups, C$_1$–C$_{20}$-alkoxy-C$_1$–C$_{20}$-alkyl groups, C$_1$–C$_{20}$-oxy-N—C$_1$–C$_{20}$-alkyl groups, —N-cyclic-C$_1$–C$_{10}$-alkyl groups, and cyclic-N—C$_1$–C$_{10}$-alkyl groups —COR$^{4'}$, where R$^{4'}$ is hydrogen, C$_1$–C$_6$ alkyl, phenyl, or —C$_1$–C$_{20}$ COO(H or C$_1$–C$_4$ alkyl). Each R$^{3''}$ is independently hydrogen or C$_1$–C$_8$ alkyl.

Examples of alkyl groups having not more than twenty carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl; exemplary branched alkyl groups are isopropyl, isobutyl, t-butyl, 2,2-dimethylpropyl, 2-methylpropyl, cyclohexylmethyl, cyclohexylethyl, 2-ethylhexyl, 3,5,5-trimethylhexyl, 2-hexylundecyl, and 5,7,7-trimethyl-2-(1,3,3-trimethylbutyl)hexyl; exemplary cyclic alkyl groups are cyclohexyl.

Examples of alkoxy(alkyl) groups are methoxy, ethoxy, propoxy, isopropoxy, butoxy, isobutoxy, pentoxy, isopentoxy, hexoxy, 2-ethylhexyloxy, heptoxy, octoxy, decyloxy, dodecyloxy, tetradecyloxy, hexadecyloxy and octadecyloxy, nonadecyloxy. Preferred alkoxy examples are C$_6$–C$_{12}$ alkoxy, in particular heptoxy and octoxy.

Examples of the alkoxyalkylenoxyalkyl groups are C$_1$–C$_{20}$-alkoxy-C$_1$–C$_5$-alkylenoxy-C$_1$–C$_{20}$-alkyl groups. The C$_1$–C$_{20}$-alkoxy groups and C$_1$–C$_{20}$-alkyl groups include those mentioned as examples of the alkoxyalkyl groups. Examples of the C$_1$–C$_5$-alkylenoxy groups include —CH$_2$O—, —CH$_2$CH$_2$O—, —CH$_2$CH$_2$CH$_2$O—,

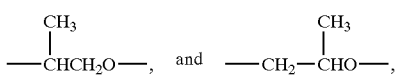

Particularly, C$_1$–C$_2$-alkoxy-C$_1$–C$_5$-alkylenoxy-C$_1$–C$_{12}$-alkyl groups are more preferred.

Examples of C$_5$–C$_{12}$cycloalkyl unsubstituted or mono-, di- or tri-substituted by C$_1$–C$_4$ alkyl are cyclopentyl, methylcyclopentyl, dimethylcyclopentyl, cyclohexyl, methylcyclohexyl, dimethylcyclohexyl, trimethylcyclohexyl, t-butylcyclohexyl, cyclooctyl, cyclodecyl and cyclododecyl. Unsubstituted or substituted cyclohexyl is preferred.

Examples of C$_5$–C$_{12}$ cycloalkoxy are cyclopentoxy, cyclohexoxy, cycloheptoxy, cyclooctoxy, cyclodecyloxy and cyclododecyloxy, including as applied to R$_3$. Cyclopentoxy and cyclohexoxy are preferred.

Examples of C$_3$–C$_6$alkenyl are allyl, 2-methylallyl, butenyl and hexenyl, 3-butenyl, and 10-undecenyl; examples of branched alkenyl groups are 1-methyl-2-propenyl, 3-methyl-3-butenyl. Allyl is preferred.

Examples of C$_7$–C$_9$ phenylalkyl unsubstituted or mono-, di- or tri-substituted on the phenyl by C$_1$–C$_4$ alkyl are benzyl, methylbenzyl, dimethylbenzyl, trimethylbenzyl, t-butylbenzyl and 2-phenylethyl. Benzyl is preferred.

Examples of aliphatic and aromatic C$_1$–C$_{10}$ acyl are C$_1$–C$_8$ alkanoyl or C$_3$–C$_8$-alkenoyl, for example, acetyl, propionyl, butyryl, isobutyryl, pentanoyl, benzoyl, hexanoyl, heptanoyl, octanoyl, 2-ethylhexanoyl, acryloyl and crotonyl. Acetyl is preferred.

When more than one hindered amine group is present they can be identical or different, and preferably are identical hindered amine groups.

Exemplary aromatic tri-carbonyl compounds are the following (XI) and (XII),

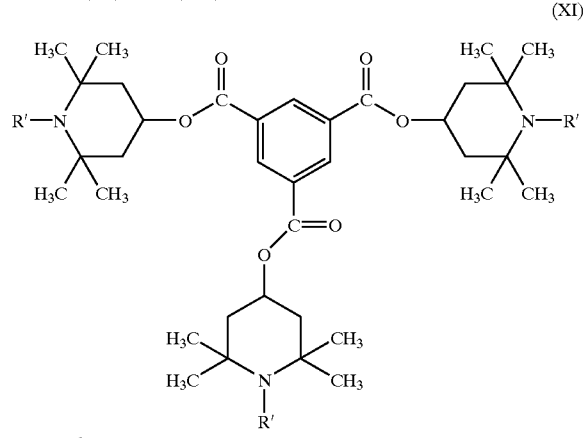
(XI)

and

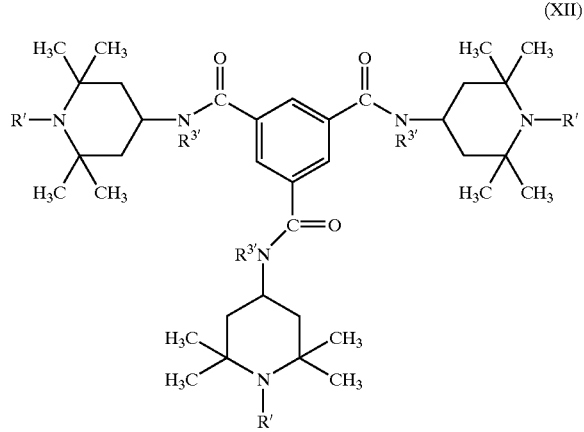

(XII)

wherein R' and R³' is defined as in (X).

The most preferred compound which is an aromatic di-amide is 1,3-benzenedicarboxamide, N,N'-bis(2,2,6,6-tetramethyl-4-piperidinyl (TSCA Inventory Name) (CAS Registry No. 42774-15-2) having the following formula (XIII):

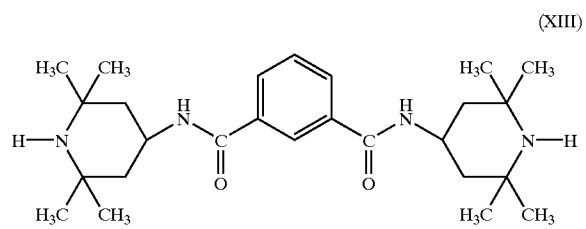

(XIII)

and is commercially available as NYLOSTAB® S-EED™ from Clariant.

The aromatic di- or tri-carbonyl ester amide compounds can be prepared by known means, for example, by the reaction of an aromatic di- or tri-carboxylic acid di- or tri-chloride with 2,2,6,6-tetramethyl-4-amino-piperidine. As one example 1,3,5-tri-(2',2',6',6'-tetramethylpiperidyl-4')-trimesic acid amide is prepared by reaction as follows: 42 grams of trimesic acid are heated for 5 hours at 80° C. with 144.0 ml of thionyl chloride in the presence of catalytic quantities (3 ml) of dimethylformamide and then the excess thionyl chloride is distilled off. The trimesic acid trichloride thus formed is dissolved in 500 ml of dioxane, then a total of 187.2 g of 2,2,6,6-tetramethyl-4-aminopipyridine is added dropwise while stirring, whereby dioxane (2000 ml in all) is constantly added to allow the reaction mixture to remain stirrable. The temperature of the reaction mixture is not allowed to exceed 30° C. The reaction mixture is subsequently boiled for 48 hours with reflux cooling, the residue is filtered, washed with acetone, dissolved in approx. 1000 ml of water, precipitated again with soda solution (pH 10–11), filtered, and the residue washed with water and vacuum-dried, yielding 89.2 g (72%) of a white powder having a melting point of >320° C. Isophthalic acid, or terephthalic acid likewise can be substituted in the above, and under suitable conditions the corresponding acid amides can be made, e.g. 1,3- or 1,4-di-(2',2',6',6'-tetramethylpiperidyl-4')-phthalic acid amide.

In like manner the reaction above can be made substituting 2,2,6,6-tetramethyl-4-aminopiperidine with 2,2,6,6-tetramethyl piperizine, and likewise the N-substituted hindered amines, substituted with following N-substituents may be used: $C_1$–$C_{18}$alkyl, O, OH, $CH_2CN$, $C_1$–$C_{18}$ alkoxy, alkoxyalkylenoxyalky, $C_5$–$C_{12}$ cycloalkoxy, $C_3$–$C_6$alkenyl, $C_7$–$C_9$phenylalkyl unsubstituted or mono-, di- or tri-substituted on the phenyl by $C_1$–$C_4$ alkyl; or aliphatic or aromatic $C_1C_{10}$ acyl groups.

One aspect of the present invention is that some UV absorbers if present in the compositions of the present invention inhibit the degree of fluorescence while the presence of other UV absorbers does not inhibit the degree of fluorescence. The term "non-inhibiting UV absorber" as used herein refers to a UV absorber that does not inhibit fluorescence prior to UV exposure. A non-inhibiting UV absorber suitable for use in the present invention has an absorptivity of from about 25 L/(g·cm) to about 200 L/(g·cm); a wavelength of less than about 370 nm, preferably about 290 to 340 nm; or a maximum wavelength of about 310 to 315 nm. Non-inhibiting UV absorbers that are preferred in the fluorescent compositions of the present invention include, but are not limited to, UV absorbers of the classes of oxanilides, salicylates, benzyl malonates, and cinnamates. Examples of these non-inhibiting UV absorbers include, but are not limited to, NYLOSTAB® S-EED™, SANDUVOR® VSU, SANDUVOR® PR25, tetraethyl-2,2'-(1,4-phenylenedimethylidyne)-bismalonate (CAS Number: 6337-43-5), TINUVIN® 312, SANDUVOR® 3206, SANDUVOR® PR31, FERRO AM 340, CYASORB® 2908, SANDUVOR® EPU, TINUVIN® 315 and cyanoacrylates such as SANDUVOR® 3039. Examples of UV absorbers that may be used in the fluorescent compositions of the present invention but that are not preferred because they inhibit the degree of fluorescence include, but are not limited to, hydroxy substituted benzophenones such as SANDUVOR® 3035 and hydroxy substituted benzotriazoles such as NORBLOC® 7966, hydroxy substituted triazines such as CYASORB® 1164, and non-hydroxy substituted benoxazinones such as CYASORB® UV 3638. Such inhibiting UV absorbers have wavelengths greater than about 340 nm.

An effective amount of the compound of the formula (II), especially the compound of the formula (XIII), is from 0.01% to 25% by weight based on the weight of the polyamide. The surprising effect of enhanced fluorescence is seen at this level. Preferably, the amount is from 0.05% to 20% by weight. Most preferably, the amount is 3% to 10% by weight.

It is known that a polyamide or a polyester having incorporated the compound of the formula (XIII) results in an improvement in the heat stability, light stability, and chemical stability of the polymer as well as the stability and the light resistance of the coloring agent in the pigmented polymer. U.S. Pat. No. 5,965,261, U.S. Pat. No. 5,969,014, and WO 97/43335 make such disclosures, each of which are herein incorporated by reference. However, until now, it was not known that the presence of this compound accentuates the fluorescence of the yellow fluorescent pigment compositions of the present invention.

Various methods can be employed for preparing the fluorescent pigment compositions of the present invention.

In general, the pigment can be added to the polyamide directly by mixing it with the polyamide. It may be mixed while the polyamide is either in the molten state or in dry powder form. If in the molten state, the molten polyamide is typically in a suitable receptacle, such as an extruder, when the pigment is introduced into the receptacle. The pigment is worked into the polyamide to produce a uniform dispersion prior to molding, melt extruding or spinning. When the pigment is added to the polyamide in a powdered form, the dry mixture is blended and dispersed by suitable means such as a blender prior to molding, melt extruding or spinning.

Another method in accordance with the present invention is physically mixing and blending the additive with the pigment to form a physical mixture and then adding the mixture to the polyamide. The mixture can then be formed into an article, for example by formula (XIII), is present in the article in an amount of about 0.001% to 0.03% by weight based upon the weight of the article. More preferably, it is from about 0.005% to 0.03% by weight based upon the weight of the article. This method of combining the pigment and the additive physically together (without a resin) is referred to as a mastermix as opposed to a masterbatch. The amount of pigment to additive can be mixed in any proportion. However, the preferred ratios of pigment to additive are 50:50, 60:40, 40:60, 70:30 and 30:70.

Another method of combining the pigment with the polyamide to form the fluorescent pigment compositions of the present invention is by first forming an intermediate concentrate or masterbatch comprising the pigment. This concentrate or masterbatch is referred to as a single pigment concentrate or masterbatch when it is comprised of a single pigment. The concentrate or masterbatch which comprises the pigment is formed of a carrier polymer which is a polyamide or a polymer which is intimately dispersible in or compatible with the polyamide. The terms "concentrate" or "masterbatch" can be used interchangably. However, the term "masterbatch" often refers to when there is more than one pigment present.

However, any method commonly used in the art to incorporate pigments into polymers may be employed in accordance with the present invention. Likewise, any of the above mentioned methods or any method commonly used in the art may be employed to incorporate additives into polymers in accordance with the present invention.

When a specific amount or percentage of pigment, for example, is needed to achieve a fluorescent polyamide composition of the present invention, a single pigment concentrate or masterbatch can be prepared and then can be "let down" to obtain the desired amount of pigment in the resulting fluorescent polyamide composition. For example, if the fluorescent pigment composition is in the form of a fiber and the desired pigment level in the final fiber is 1.2% by weight based on the weight of the polyamide, a 30% single pigment concentrate or masterbatch, for example, can be let down. The term "let down," as used herein, refers to the ratio of:

$$(x)(y)=(x')(y')$$

wherein x is the amount of the single pigment concentrate or masterbatch, y is the percentage of pigment in the single pigment concentrate or masterbatch, x' is the batch size of the fluorescent pigment composition (in the same units as x), and y' is the percentage of pigment in the final fluorescent polyamide composition.

Therefore, in the above example, if x' is 100 lb, y' is 1.2% and y is 30%, then 4 lb of the 30% single pigment concentrate or masterbatch is needed to produce a fluorescent polyamide fiber having a pigment concentration of 1.2%. Thus, in this example, the let down ratio would be 4:1. It is also sometimes referred to as a 4% let down.

As stated previously, it is another aspect of the present invention to include additives in the fluorescent pigment compositions of the present invention. A method that can be used in accordance with the present invention to add additives is often referred to in the art as preparing a fully formulated system or a custom formulation. In this method, for example, a 10% loading of an additive may be desired (0.1 g of additive per 100 g of polyamide). Individual additive masterbatches based upon this loading are then prepared and formed into pellets. The individual pellets can then be added to the polyamide alone or in combination with other additive masterbatches. When the additive masterbatch is used to prepare an article, the additive, preferably the compound of the formula (XIII), is present in the article in an amount of preferably from about 0.001% to 0.03% by weight based upon the weight of the article. More preferably, it is from about 0.005% to 0.03% by weight based upon the weight of the article.

In yet another method, a single pigment concentrate or masterbatch is obtained and let down to get a desired final percentage of pigment in the polyamide, and a separate additive masterbatch is prepared and separately let down in the same way to get the desired final percentage of additive in the polyamide. The masterbatch may then be mixed and added to the polyamide. The resulting composition can be formed into an article. The additive, preferably the compound of the formula (XIII), is present in the article in an amount of preferably from about 0.01% to 0.4% by weight based upon the weight of the article. More preferably, it is from about 0.05% to 0.3% by weight based upon the weight of the article.

However, the most preferred method in accordance with the present invention is the method in which an additive is added together with the pigment to form the concentrate or masterbatch. This method provides enhanced fluorescence as the additive and the pigment are in intimate contact. The amount of polyamide may have to be adjusted to maintain the desired pigment percentage in the final fluorescent pigment composition when the weight percentages are based upon the weight of the polyamide. This masterbatch or concentrate can then be added to the polyamide to arrive at a fluorescent pigment composition with enhanced fluorescence and increased dispersion.

Fluorescence was measured by using standard spectroscopy methods. The fluorescence of the pigment compositions of the present invention is seen under black light sources and not under typical visible lighting from incandescent or fluorescent bulbs. Fluorescence is preferably seen under black light at a wavelength of about 365 nanometers.

The fluorescent yellow pigment compositions of the present invention can be formed into articles such as molded articles, cast articles, and extruded articles. Examples of molded articles include, but are not limited to, injection molded or blow molded articles. Examples of cast articles include, but are not limited to, films. Examples of extruded articles include, but are not limited to, fibers, monofilaments, and masterbatches. The fluorescent yellow pigment compositions of the present invention can be used in a variety of applications including, but not limited to, security fibers in money and security badges, any form of security indicators for military and non-military use, carpet in airplanes or hospitals. There is no limit to the number of potential applications with the fluorescent pigment compositions of the present invention.

EXAMPLES

Example 1

A 25% by weight single pigment concentrate of Pigment Violet 19 was prepared. The pigment used was Pigment Violet 19 commercially available as 13-7013 PV Fast Red ESB (lot 59784) from Clariant. The polyamide used was nylon 6. On a 10 lb basis, 2.5 lb of Pigment Violet 19 was mixed with 7.5 lb of polyamide. The mixture was then formed into a single pigment concentrate. The final composition of the concentrate was 25% by weight of Pigment Violet 19 wherein the percentage by weight was based upon the weight of the polyamide.

Example 2

A 25% by weight single pigment concentrate was prepared. The pigment used was Pigment Yellow 192 commercially available as SANDOFIL® Yellow RL or Polysynthren Yellow RL (lot 7014968) from Clariant. The polyamide used was nylon 6. On a 10 lb basis, 2.5 lb of Pigment Yellow 192 was mixed with 7.5 lb of polyamide. The mixture was then formed into a single pigment concentrate. The final composition of the concentrate was 25% by weight of Pigment Yellow 192 wherein the percentage by weight was based upon the weight of the polyamide.

Example 3

This example illustrates the methodology used to prepare the polyamide fiber samples of which fluorescence was measured. Four samples were prepared. One sample was the control. The control was a single pigment concentrate of pigment and polyamide. The level of pigment in the single pigment concentrate was 30% by weight based on the weight of the polyamide. The 30% single pigment concentrate comprised 30% Pigment Violet 19 and 70% nylon 6. The other three samples were prepared with 1.5%, 3% and 5% by weight of NYLOSTAB® S-EED™, respectively, being added to the pigment and polyamide to form a single masterbatch wherein the weight was based on the weight of the polyamide. The additive in powder form was added to the pigment and polyamide to form a powder mixture. Powdered nylon 6 was obtained from DSM and dry powder Pigment Violet 19 was obtained as PV Fast Red ESB from Clariant. The dry pigment was mixed in the dry powder nylon and was dispersed in a Henchel blender. Neither pigment dispersing aids nor lubricants were added to the mixture. The dry powder mixture was extruded. A 30 mm APV twin screw extruder of clam shell design was used. The temperature of compounding in the twin screw extruder was 250° C. The melt was extruded and formed into water quenched pellets. Additional polyamide was added as needed in order to ensure that the resulting fiber would have the desired weight percent of pigment such that fluorescence was achieved.

Example 4

The fluorescence of Pigment Violet 19 in polyamide was measured using spectroscopy. Fluorescence spectra were obtained on a SPEX Fluorolog-3 controlled by DataMax/32 v2.1 software. Excitation spectra were obtained from 300 to 560 nm using 589 nm emission, 0.5 s integration, 1 nm slits (excitation and emission), 2 nm increment, and 950 V applied to the photomultiplier detector. Emission spectra were obtained from 500 to 700 nm with 370 nm excitation. All other parameters were the same as for excitation. Excitation intensities were divided by the signal from an internal standard in order to correct for wavelength variations in lamp intensity and excitation monochromator throughput. Emission spectra were not corrected. However, the excitation reference signal was measured before and after each emission spectrum in order to monitor lamp stability. Excitation power was found to fluctuate less than 2%.

Figure 14:
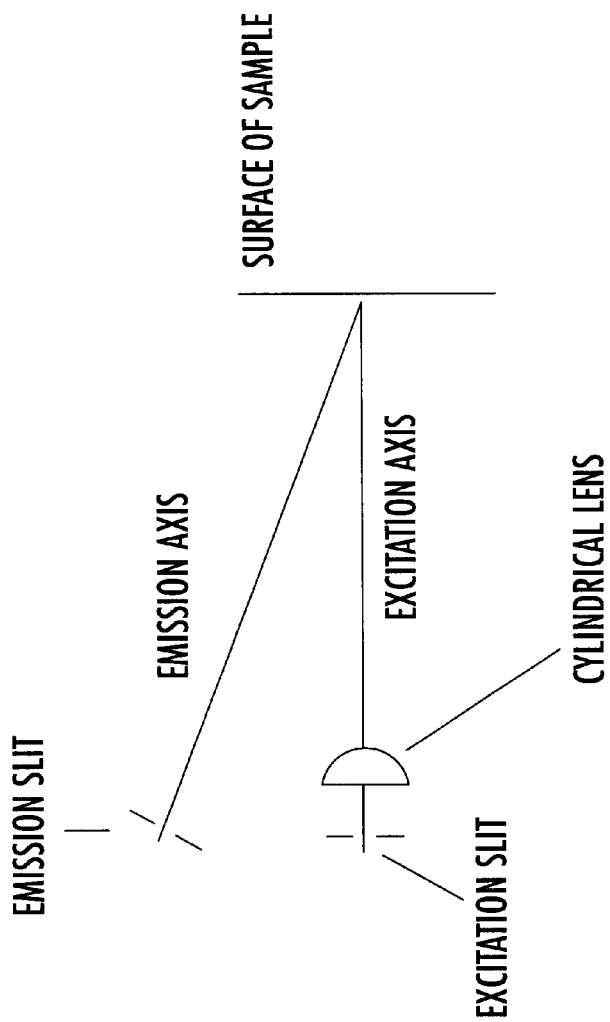
FIG. 14 is a diagram of the manner in which samples were mounted to test fluorescence.
Figure 15:
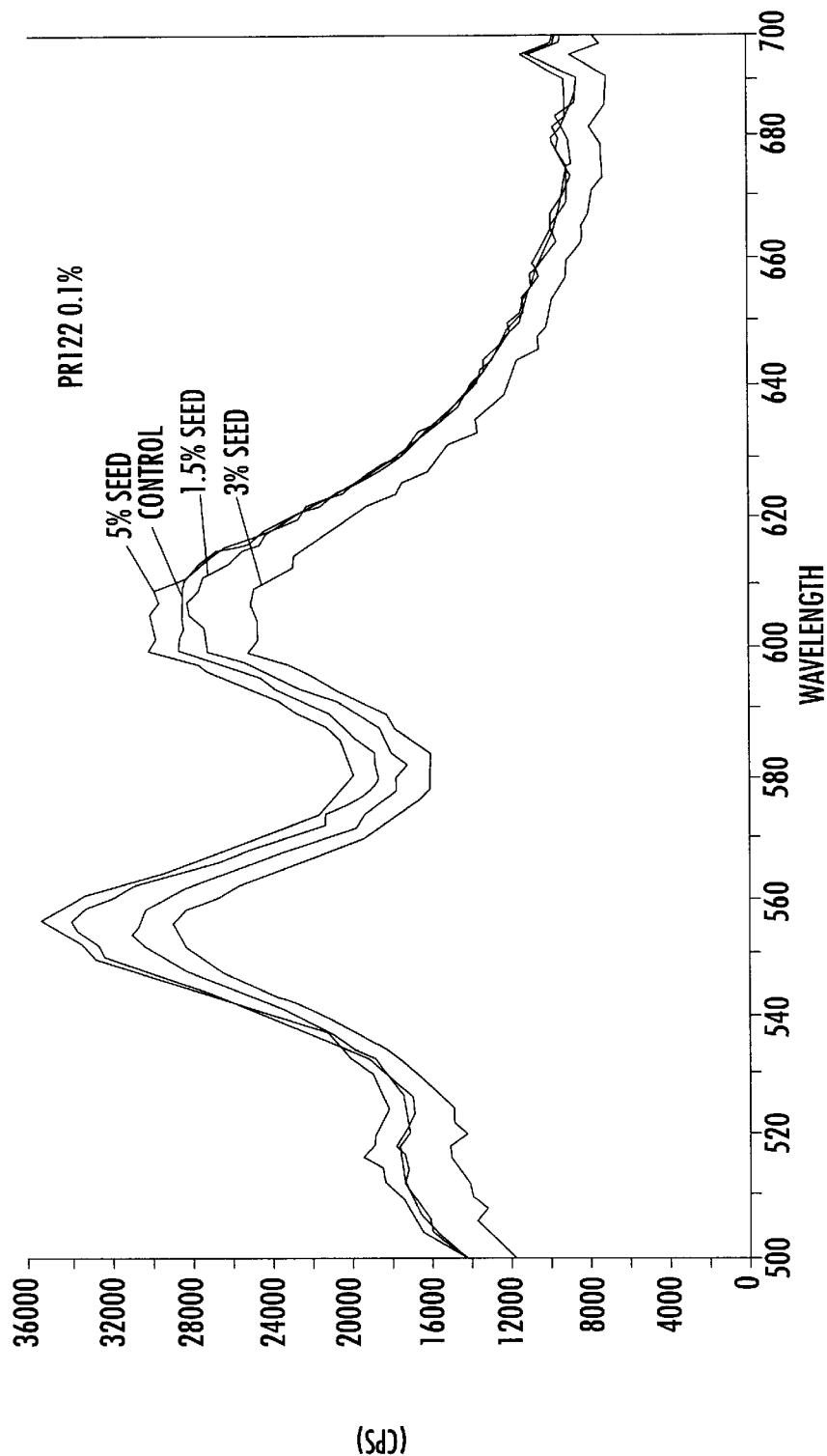
FIG. 15 is a graph of wavelength in nanometers (nm) versus whole numbers in counts per second (cps) for a nylon-6 fiber comprising 0.1% by weight of Pigment Red 122 and NYLOSTAB® S-EED™ at levels of 0%, 1.5%, 3%, and 5%, by weight.
Figure 16:
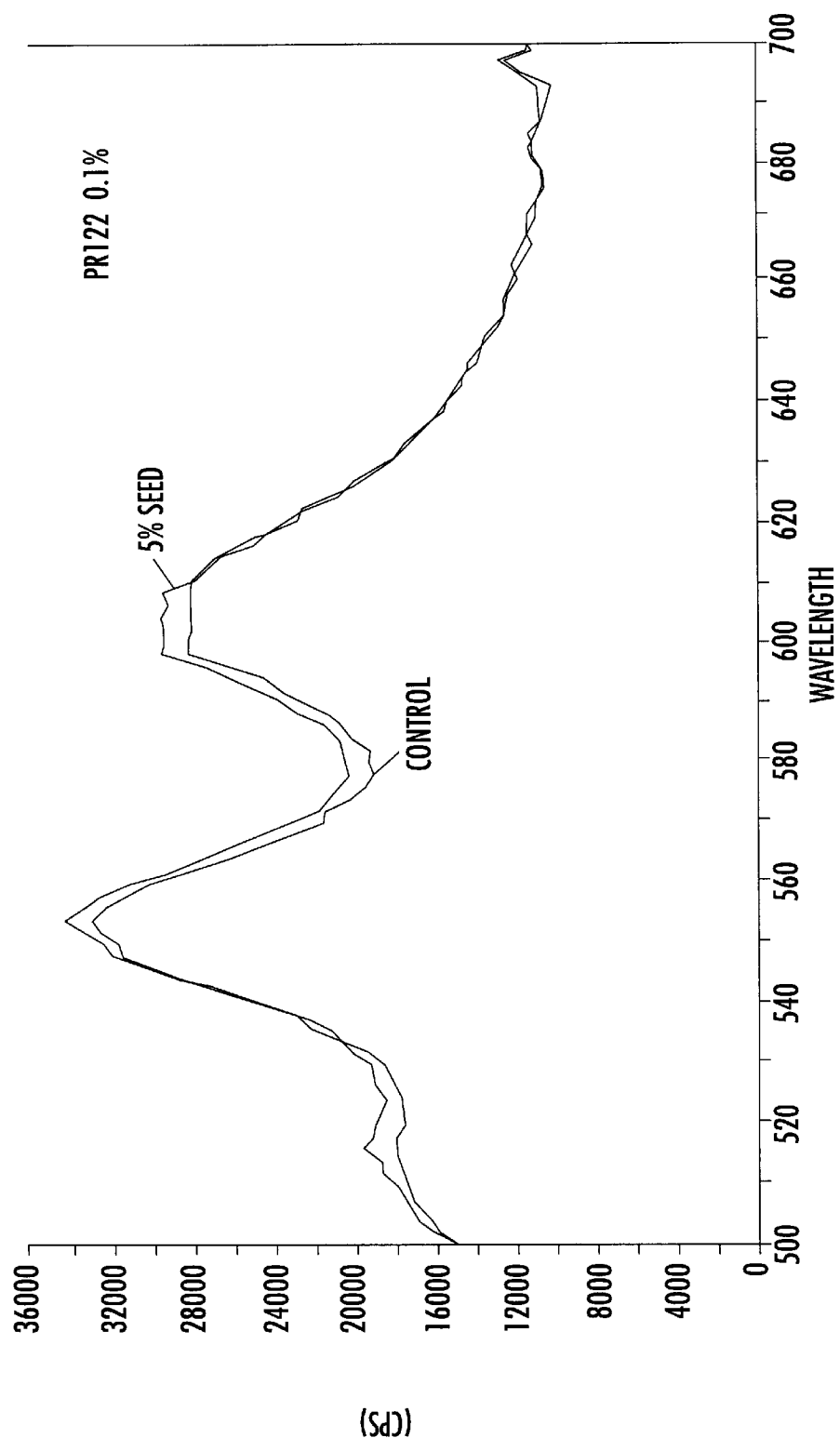
FIG. 16 is a graph of wavelength in nanometers (nm) versus whole numbers in counts per second (cps) for a nylon-6 fiber comprising 0.1% by weight of Pigment Red 122 and either with NYLOSTAB® S-EED™ at 5% by weight or without NYLOSTAB® S-EED™.
Figure 17:
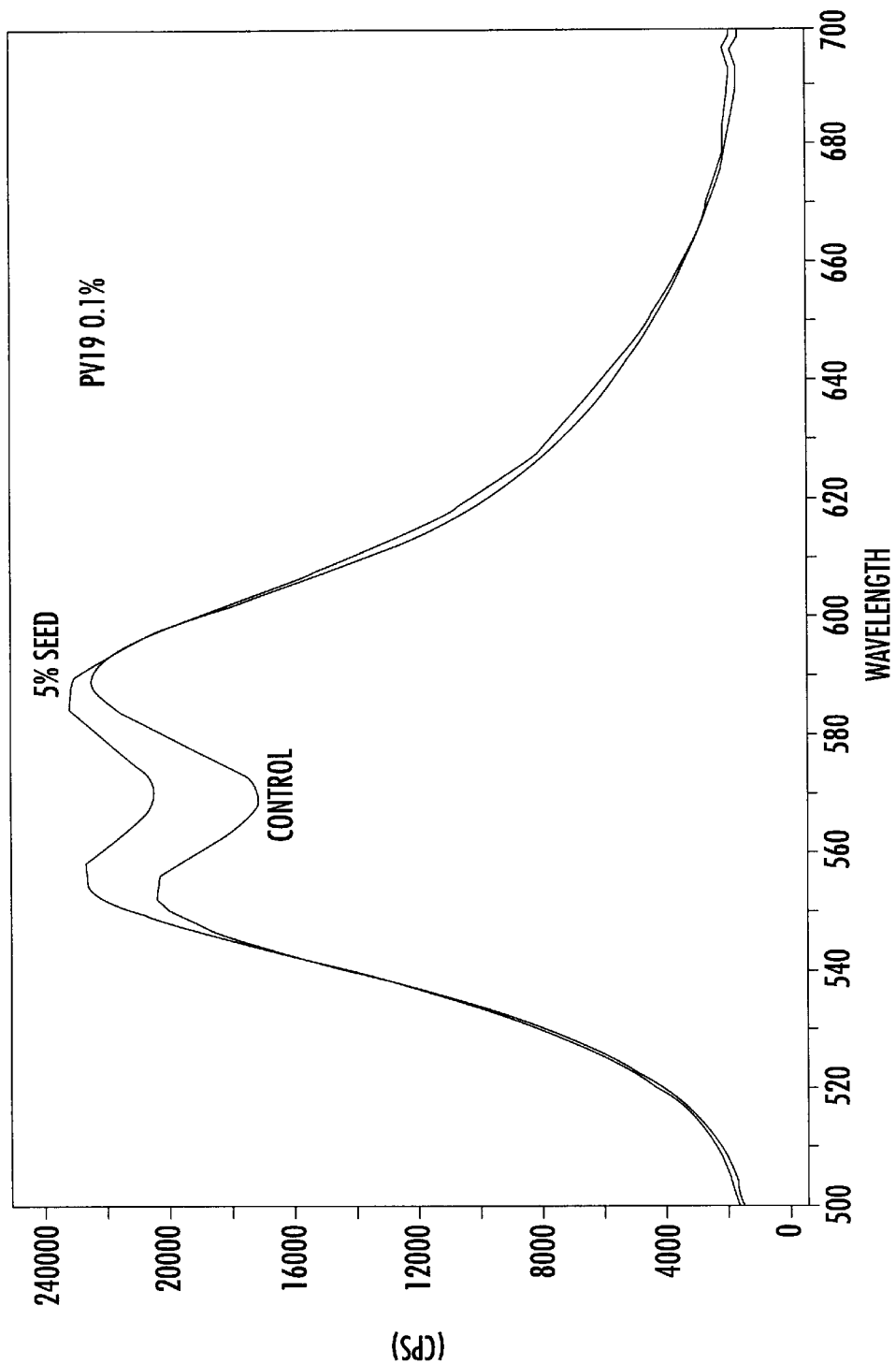
FIG. 17 is a graph of wavelength in nanometers (nm) versus whole numbers in counts per second (cps) of a nylon6 fiber comprising 0.1% by weight of Pigment Violet 19 and either with NYLOSTAB® S-FED™ at 5% by weight or without NYLOSTAB® S-EED™.
Figure 18:
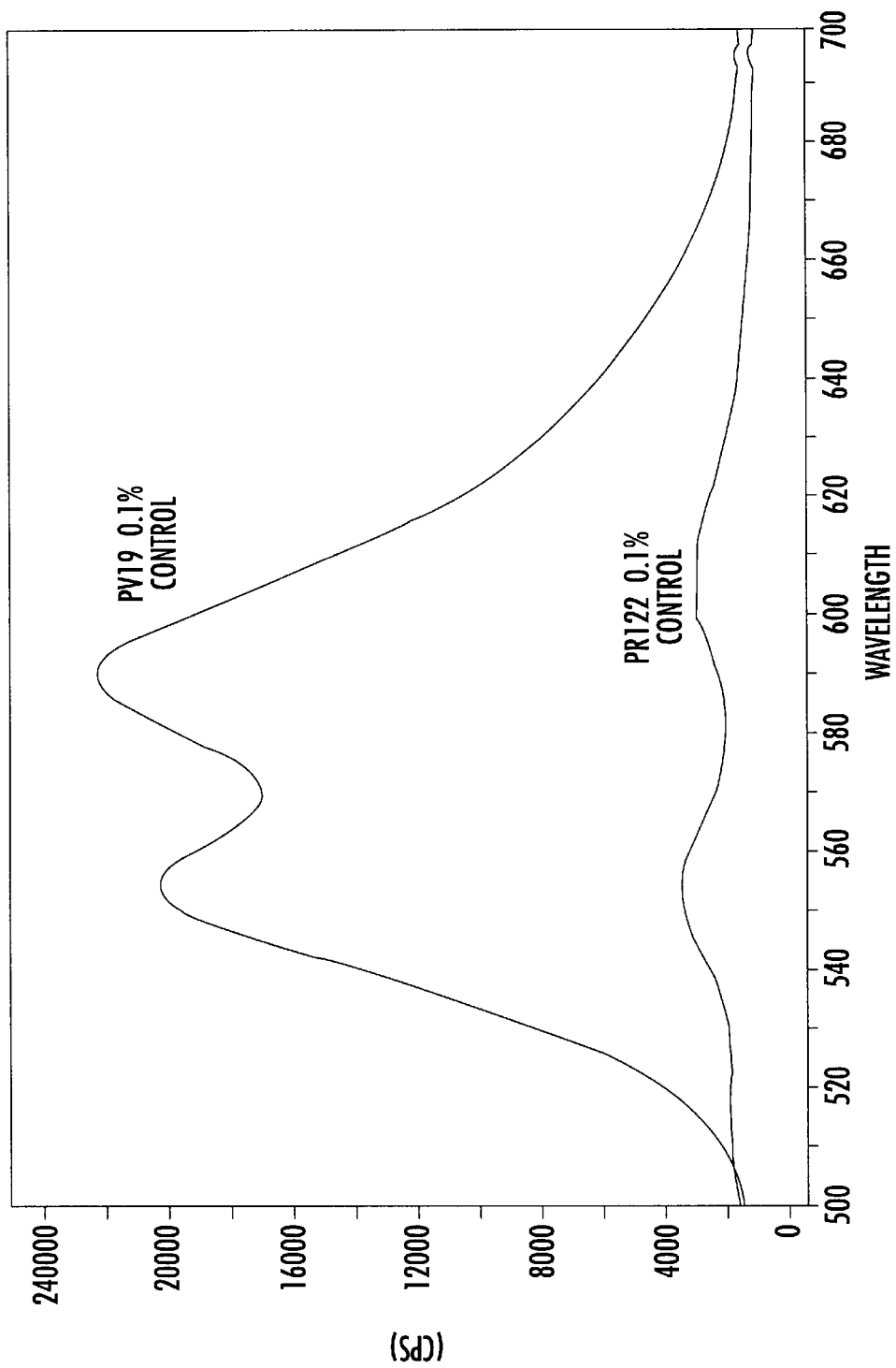
FIG. 18 is a graph of wavelength in nanometers (nm) versus whole numbers in counts per second (cps) comparing a nylon-6 fiber comprising 0.1% by weight of Pigment Violet 19 without NYLOSTAB® S-EED™ versus a nylon-6 fiber comprising 0.1% by weight of Pigment Red 122 without NYLOSTAB® S-FED™.
Figure 19:
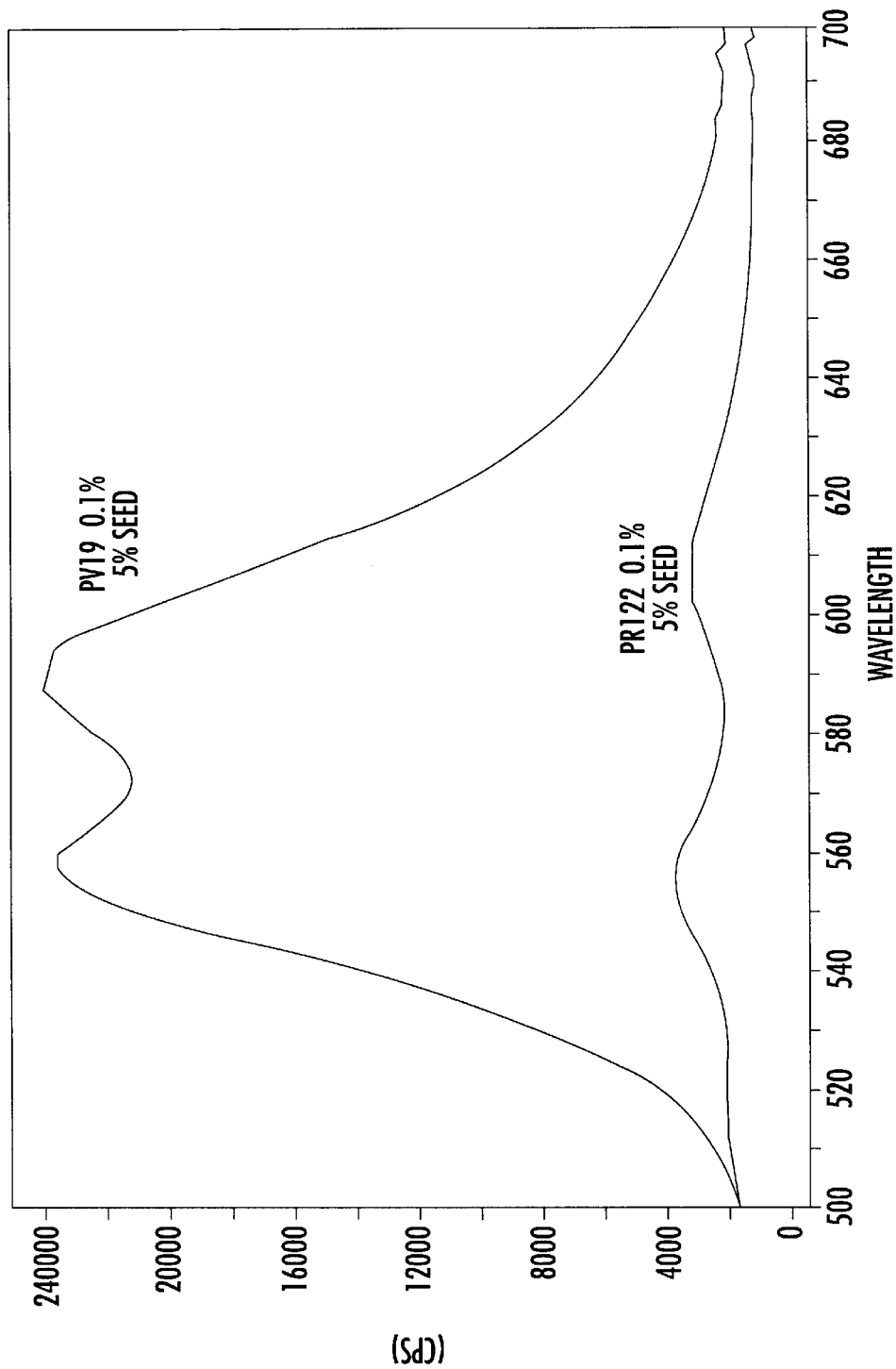
FIG. 19 is a graph of wavelength in nanometers (nm) versus whole numbers in counts per second (cps) of a nylon-6 fiber comprising 0.1% by weight of Pigment Violet 19 and 5% by weight of NYLOSTAB® S-EED™ versus a nylon-6 fiber comprising 0.1% by weight of Pigment Red 122 and 5% by weight of NYLOSTAB® S-EED™.

Card samples 1 were mounted in the sample chamber so that the plane of the card was normal to the excitation axis 2. The cards were also positioned as precisely as possible so that the excitation axis 2 and front-face emission axis 3 crossed at the surface of the sample 1 as seen in FIG. 14. Since 1 nm slits were used in this experiment for the emission slit 4 and the excitation slit 5, small errors in the positioning of the sample could lead to large changes in the measured fluorescence intensities. This problem was eliminated by placing cylindrical lens 6 in the excitation beam 7. This spread the approximately 1–2 mm wide excitation beam into a nearly uniform 1 cm beam at the sample surface, and essentially eliminated the effects of sample misalignment. It was found that samples could be repeatedly removed and reinserted with observed intensity variations of only a few percent.

Example 5

FIG. 1 illustrates the exposure and non-exposure to ultraviolet light of card wraps of polyamide fiber comprising Pigment Violet 19. Fluorescence was measured in accordance with the method of Example 4. In FIG. 1, the nylon 6 fiber of the card wraps comprised, 0.1% by weight of Pigment Violet 19 based upon the weight of the polyamide. Each card wrap was spun from a 25% single pigment concentrate of Pigment Violet 19 either with or without the presence NYLOSTAB® S-EED™ commercially available from Clariant. When the NYLOSTAB® S-EED™ was added, it was added at levels of 0% by weight, 1.5% by weight, 3% by weight or 5% by weight to the single pigment concentrate. FIG. 1 illustrates that even prior to ultraviolet exposure, the card wraps comprising NYLOSTAB® S-EED™ had greater fluorescence than the card wraps with only Pigment Violet 19.

Example 6

Figure 2:
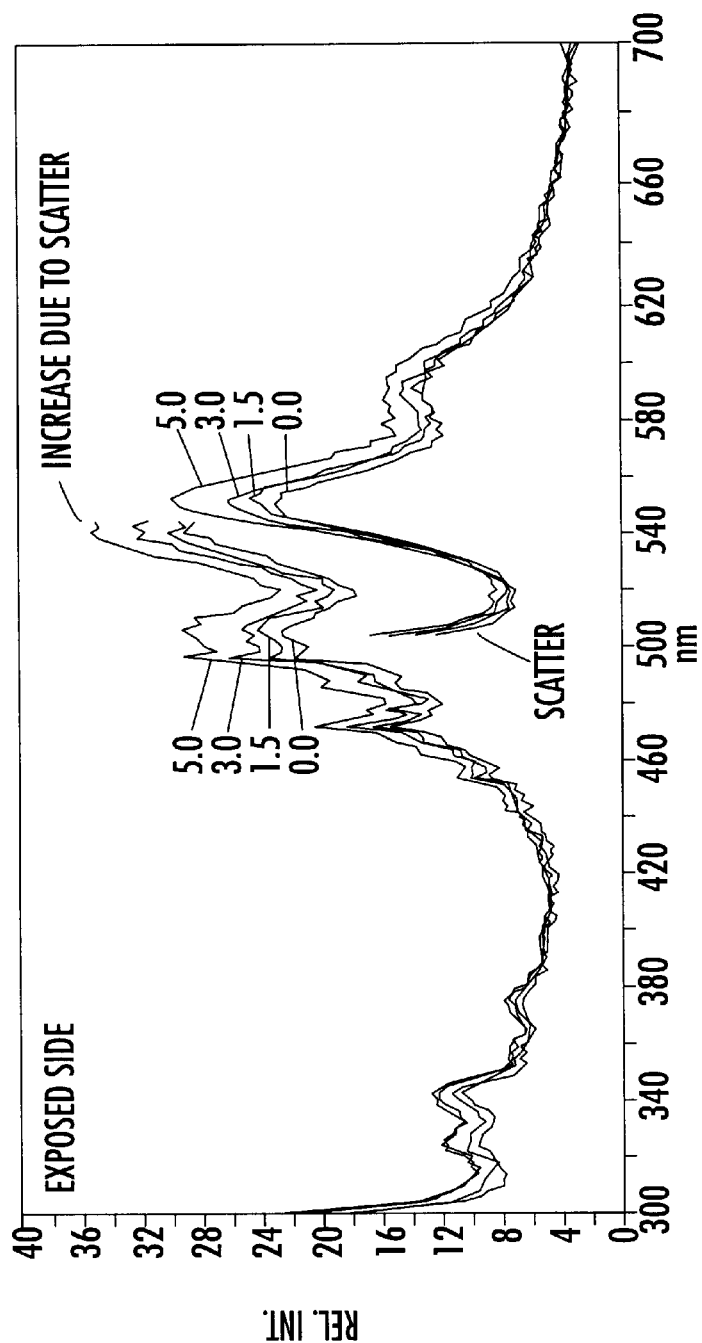
FIG. 2 is a graph of wavelength in nanometers (nm) versus relative intensity which illustrates the exposure and non-exposure to ultraviolet light of card wraps of polyamide fiber comprising 0.1% by weight of Pigment Violet 19 and NYLOSTAB® S-EED™ at levels of 0%, 1.5%, 3% or 5%, by weight after 100 hours of exposure in a QUV340 device.

FIG. 2 illustrates the exposure of card wraps of polyamide fiber comprising Pigment Violet 19 to ultraviolet light after 100 hours in a QUV340 device used for pigmented plastics and coatings, commercially available from QLV Panel. In FIG. 2, the fiber of the card wraps comprised 0.1% by weight of Pigment Violet 19 based upon the weight of the polyamide. Each card wrap was spun from the pigmented polyamide fiber either with or without NYLOSTAB® S-EED™ commercially available from Clariant, present in the fiber. When NYLOSTAB® S-EED™ was added, it was added at levels of 0% by weight, 1.5% by weight, 3% by weight or 5% by weight to the masterbatch. FIG. 2 illustrates that the relative intensity at 550 nm decreased as expected. However, the relative intensity of samples comprising NYLOSTAB® S-EED™ was unexpected. The levels of NYLOSTAB® S-EED™ at 5% by weight in the masterbatch equated to 200 ppm in the final fiber.

Example 7

Figure 3:
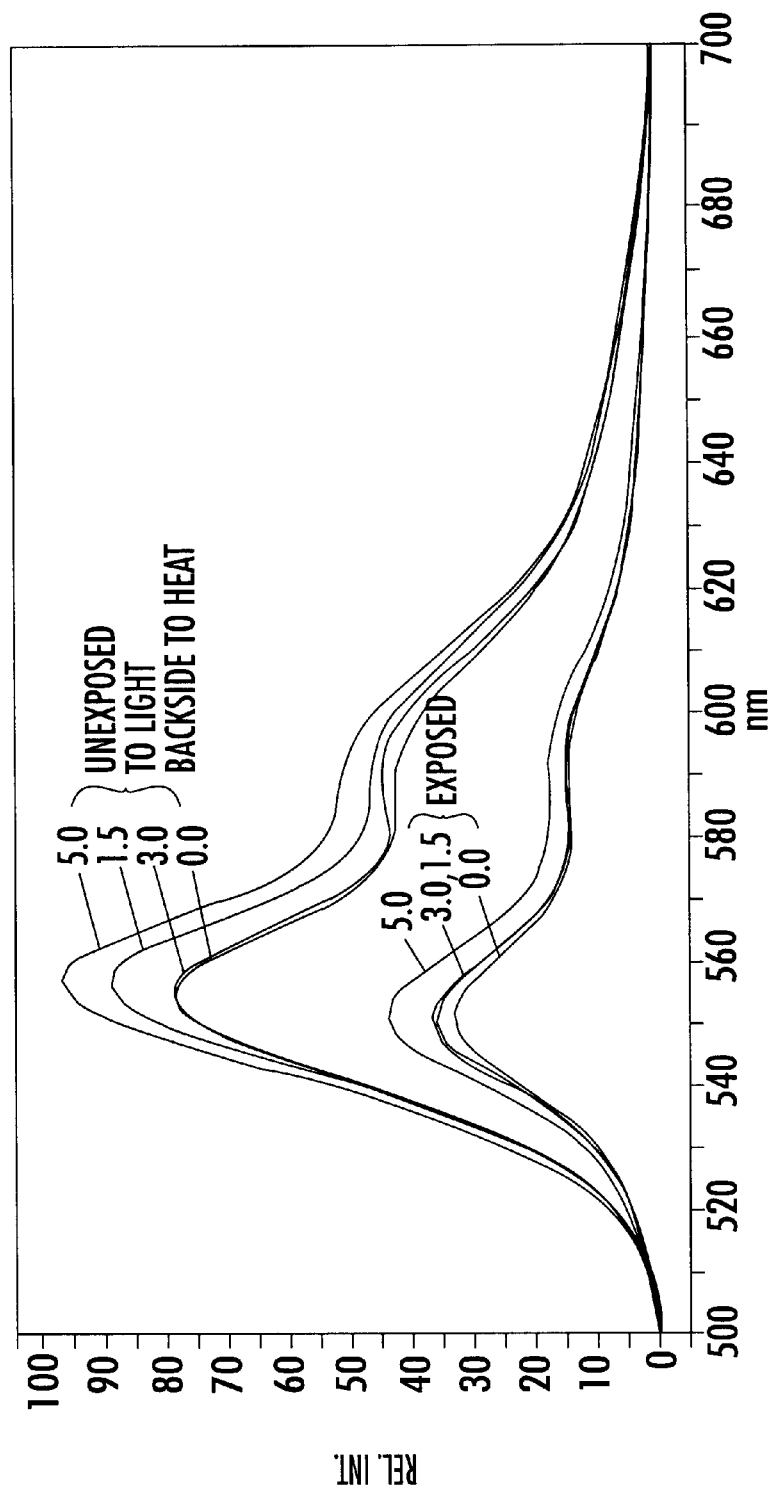
FIG. 3 is a graph of wavelength in nanometers (nm) versus relative intensity, which illustrates the exposure of card wraps of polyamide fiber comprising Pigment Violet 19 and NYLOSTAB® S-EED™ at levels of 0%, 1.5%, 3%, or 5%, by weight to ultraviolet (UV) light after 100 hours of exposure in a QUV340 device wherein the UV exposed sides of the card wraps have a lower relative intensity versus than the reverse sides of the card wraps which are exposed to heat at 70° C. but unexposed to light and have a higher relative intensity.
Figure 4:
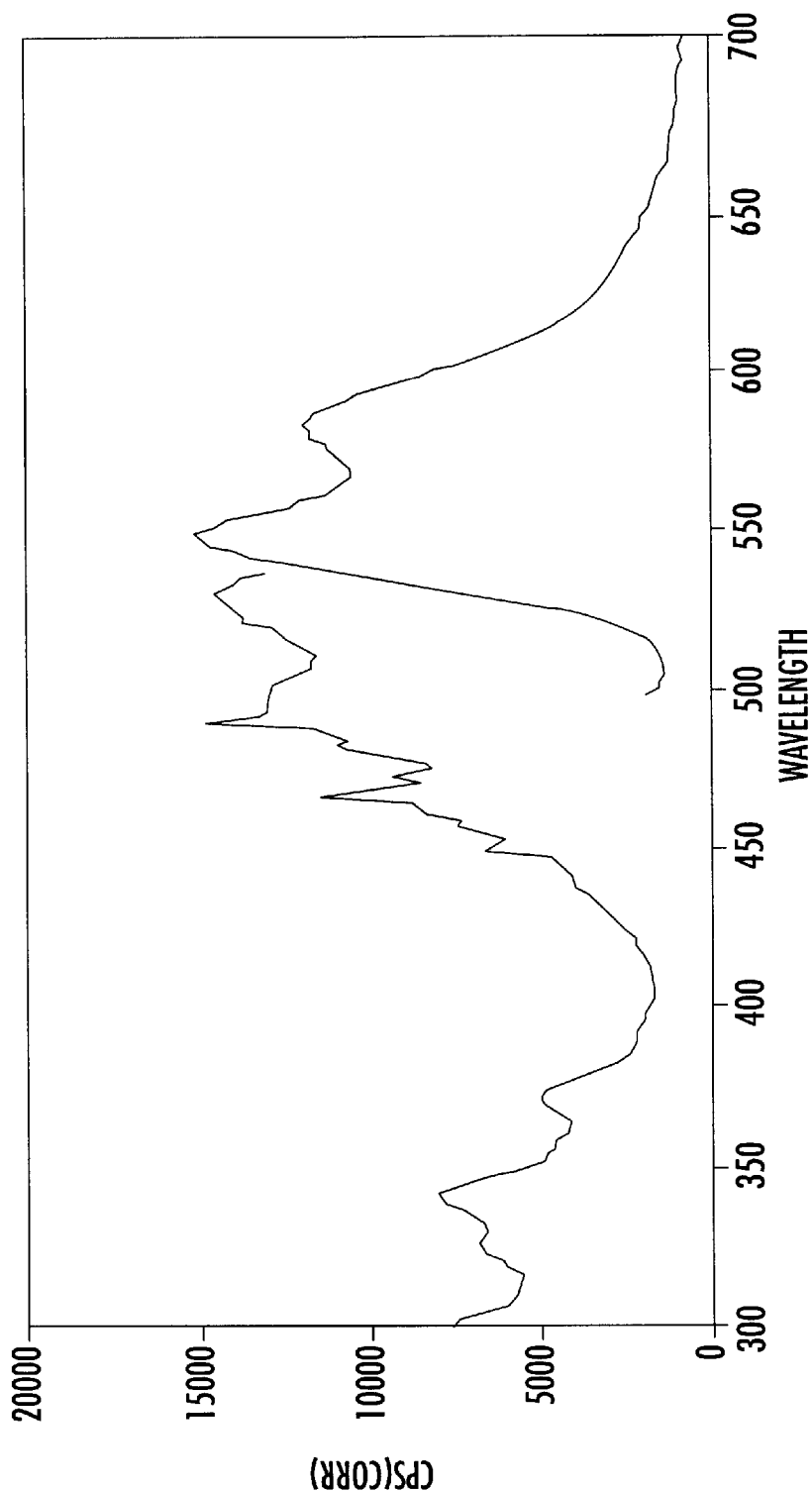
FIG. 4 is a graph of wavelength in nanometers (nm) versus whole numbers in counts per second (cps) for a first control nylon-6 fiber comprising 0.1% by weight of Pigment Violet 19 with no UV absorber present and with no ultraviolet light exposure (initial).
Figure 5:
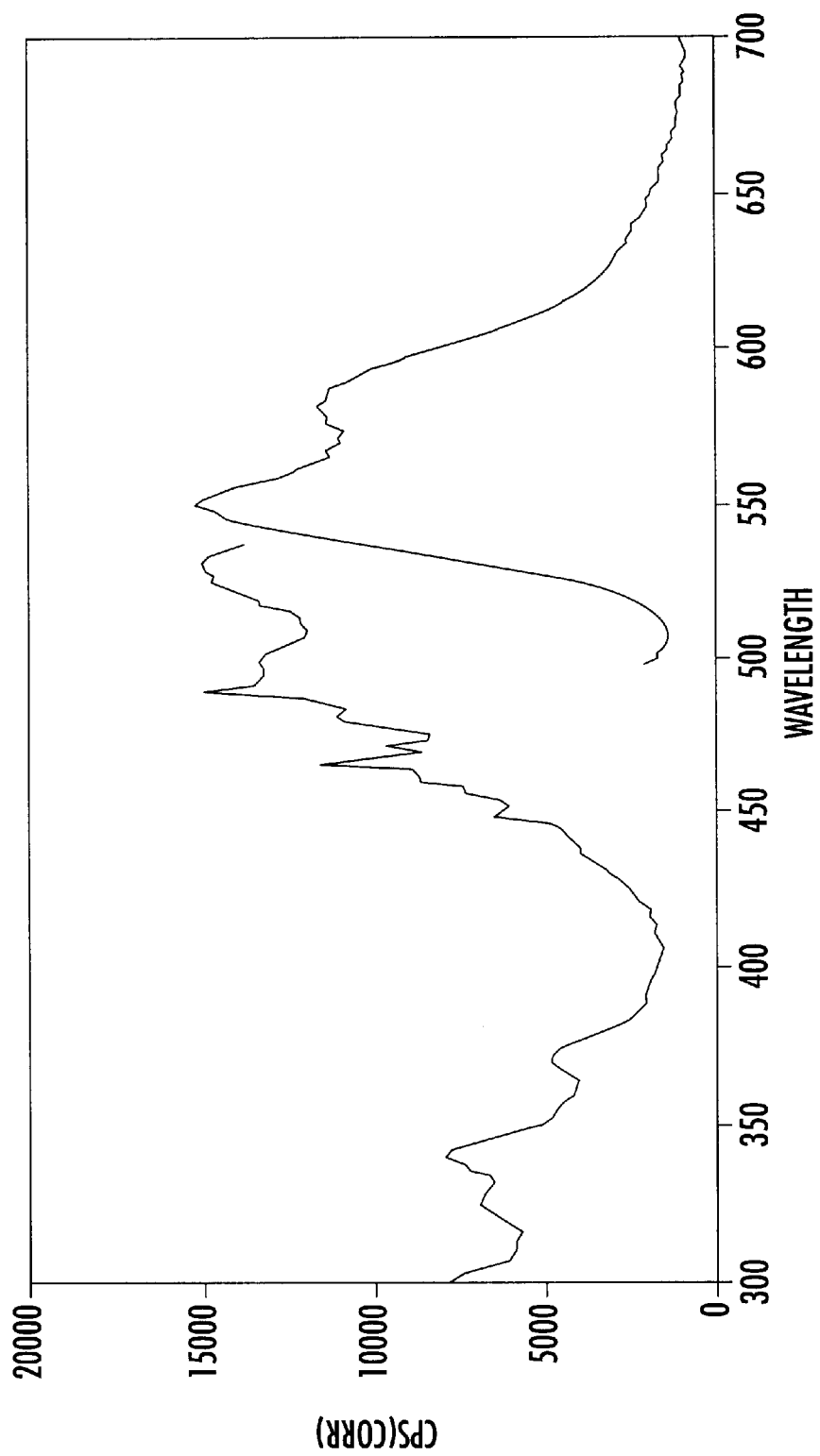
FIG. 5 is a graph of wavelength in nanometers (nm) versus whole numbers in counts per second (cps) for a second control nylon-6 fiber comprising 0.1% by weight of Pigment Violet 19 and with no UV absorber present.
Figure 6:
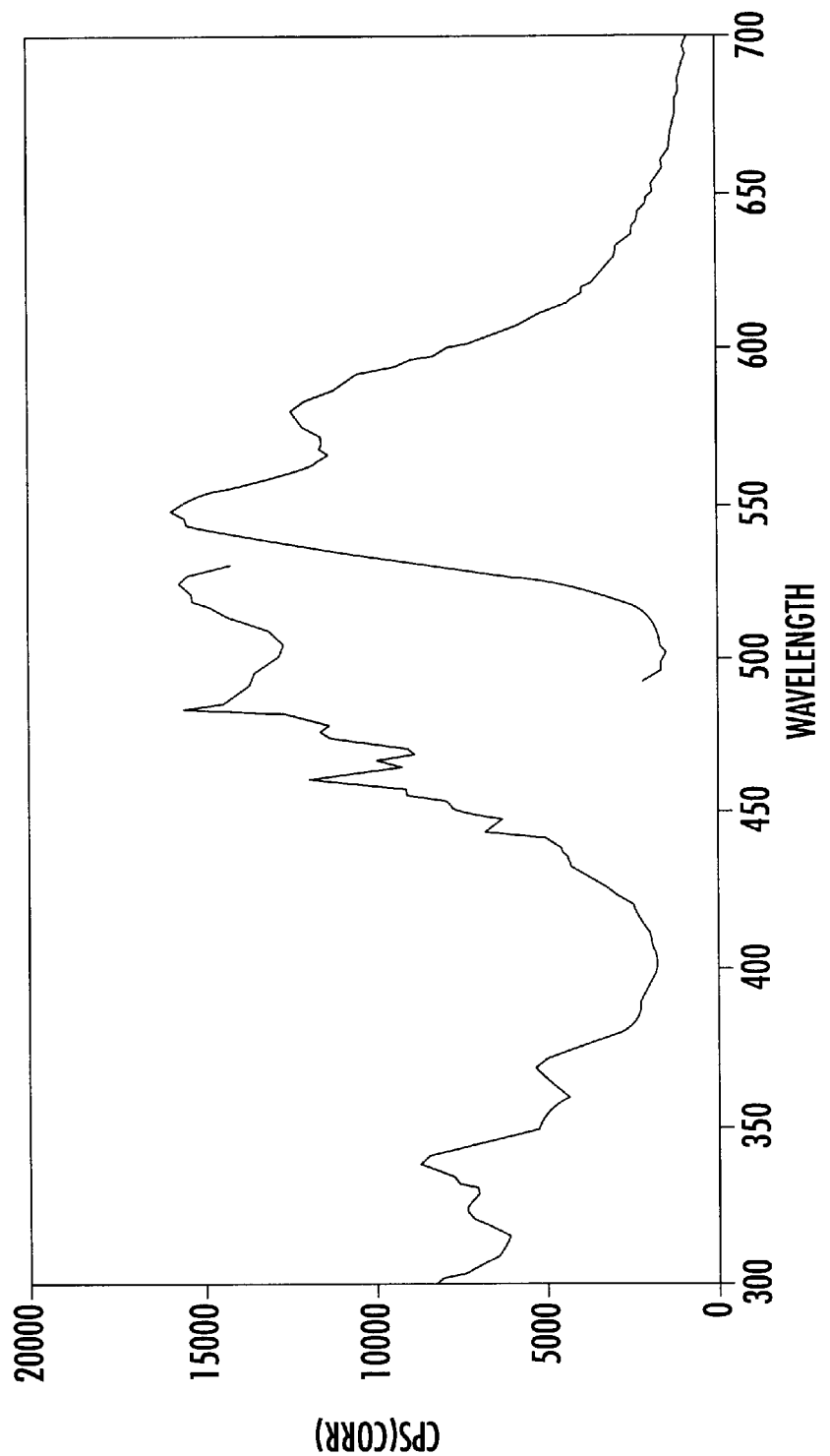
FIG. 6 is a graph of wavelength in nanometers (nm) versus whole numbers in counts per second (cps) for a nylon-6 fiber comprising 0.1% by weight of Pigment Violet 19 and 0.5% by weight of NYLOSTAB® S-EED™.
Figure 7:
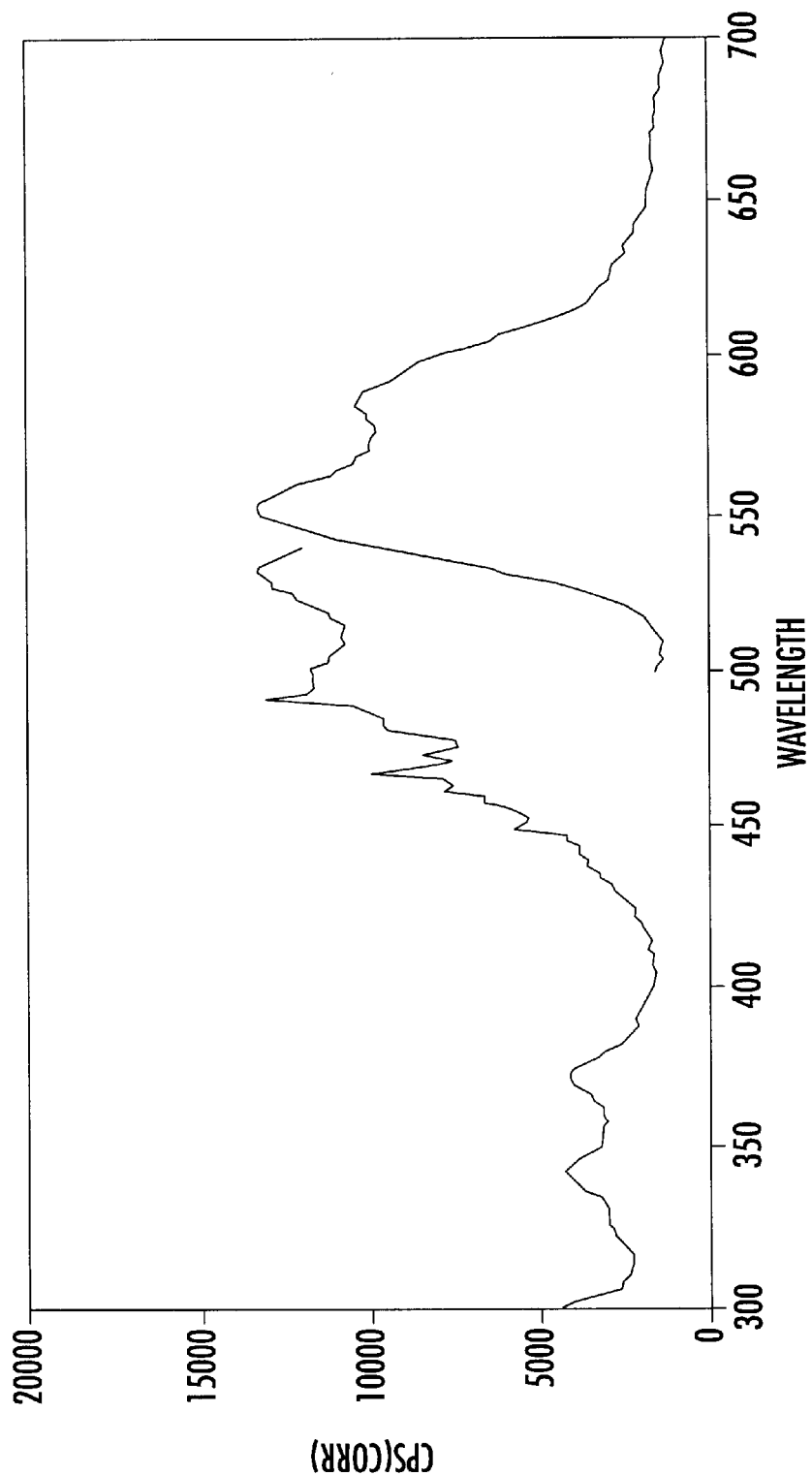
FIG. 7 is a graph of wavelength in nanometers (nm) versus whole numbers in counts per second (cps) for a nylon-6 fiber comprising 0.1% by weight Pigment Violet 19 and 0.5% by weight of each NYLOSTAB® S-EED™ and SANDUVOR® VSU.
Figure 8:
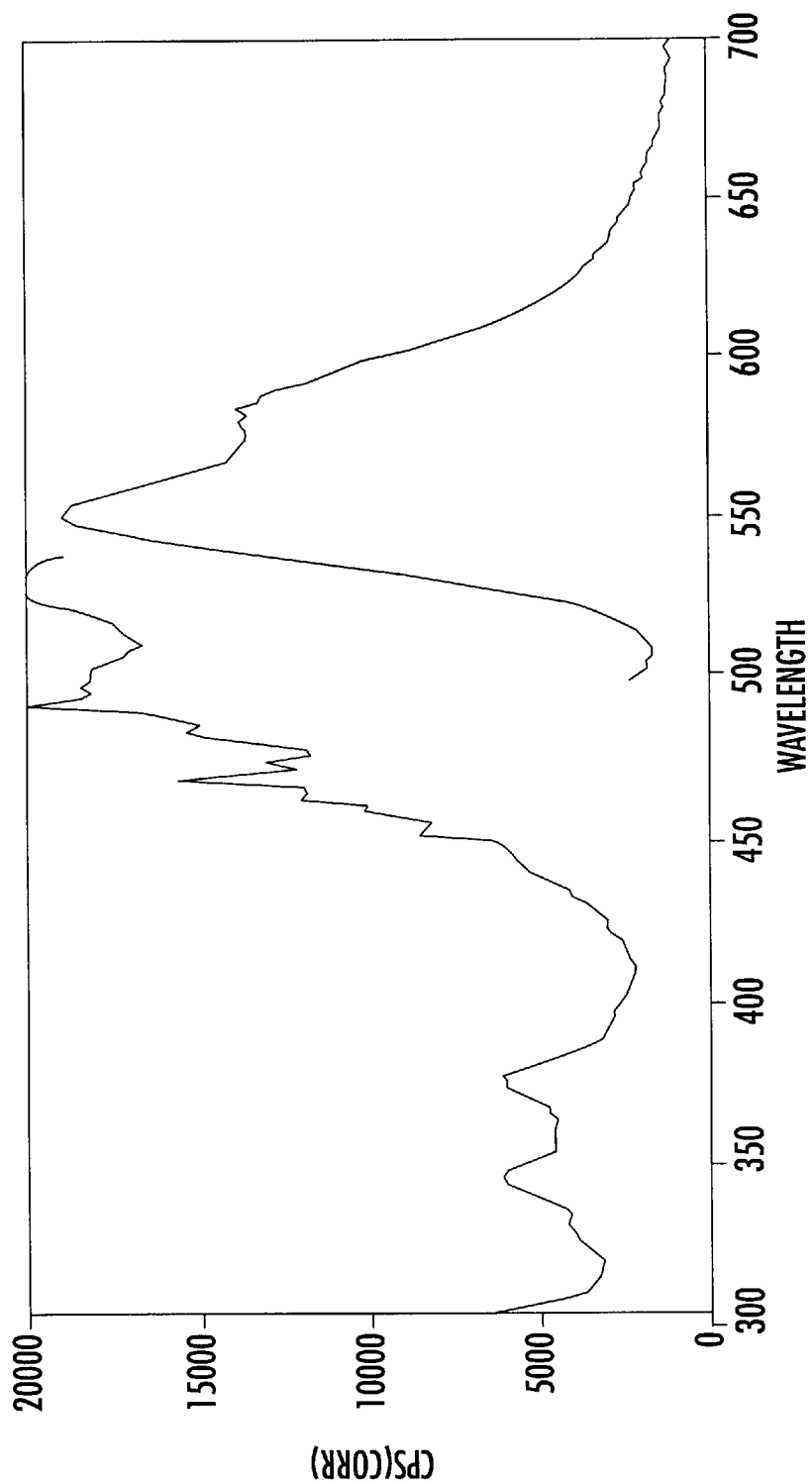
FIG. 8 is a graph of wavelength in nanometers (nm) versus whole numbers in counts per second (cps) for a nylon-6 fiber comprising 0.1% by weight of Pigment Violet 19 and 0.5% by weight SANDUVOR® VSU.
Figure 9:
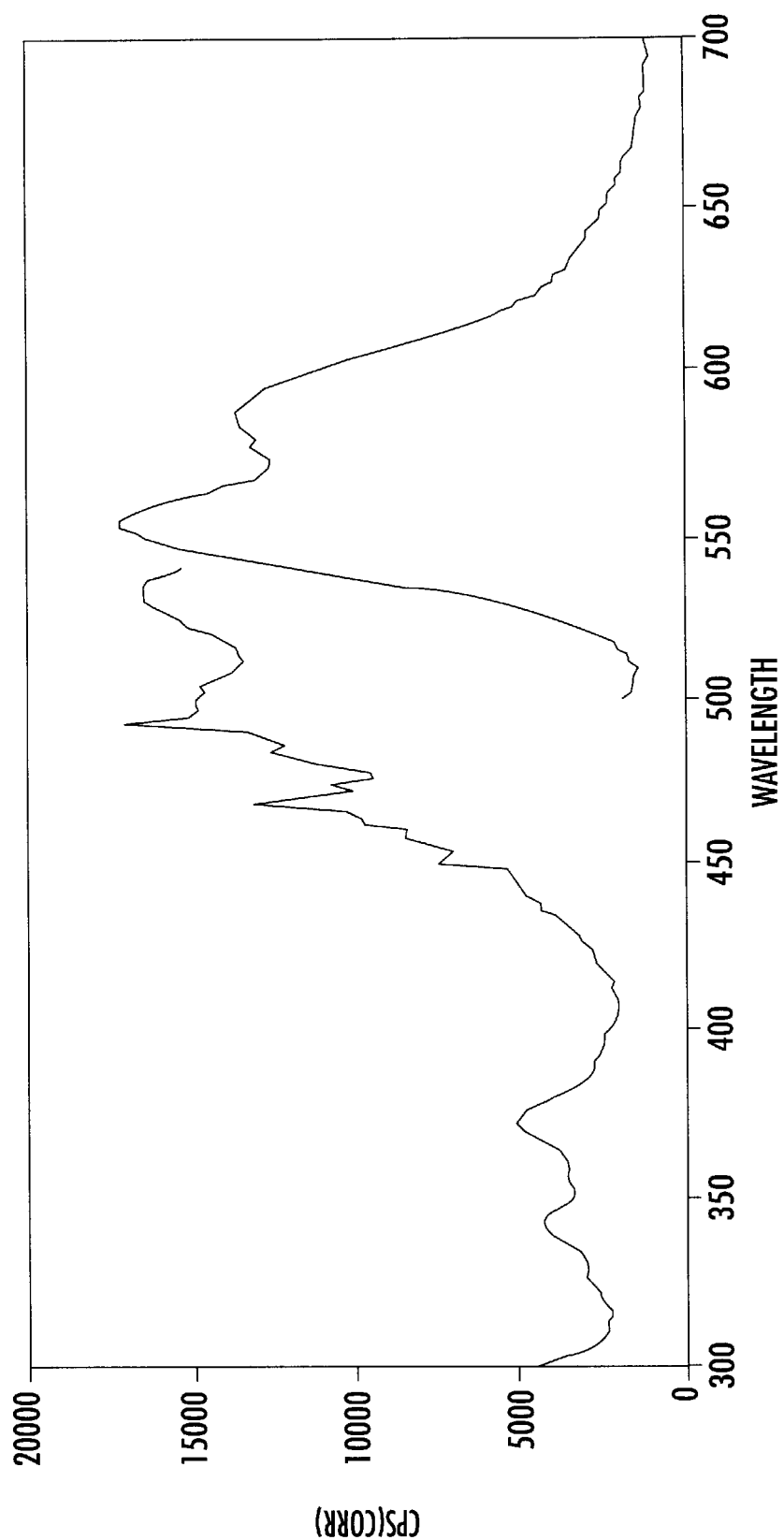
FIG. 9 is a graph of wavelength in nanometers (nm) versus whole numbers in counts per second (cps) for a nylon-6 fiber comprising 0.1% by weight of Pigment Violet 19 and 1% by weight of SANDUVOR® VSU and NYLOSTAB® S-EED™, wherein the fiber was prepared from a 25% Pigment Violet 19 masterbatch comprising 3% by weight of NYLOSTAB® S-EED™.
Figure 10:
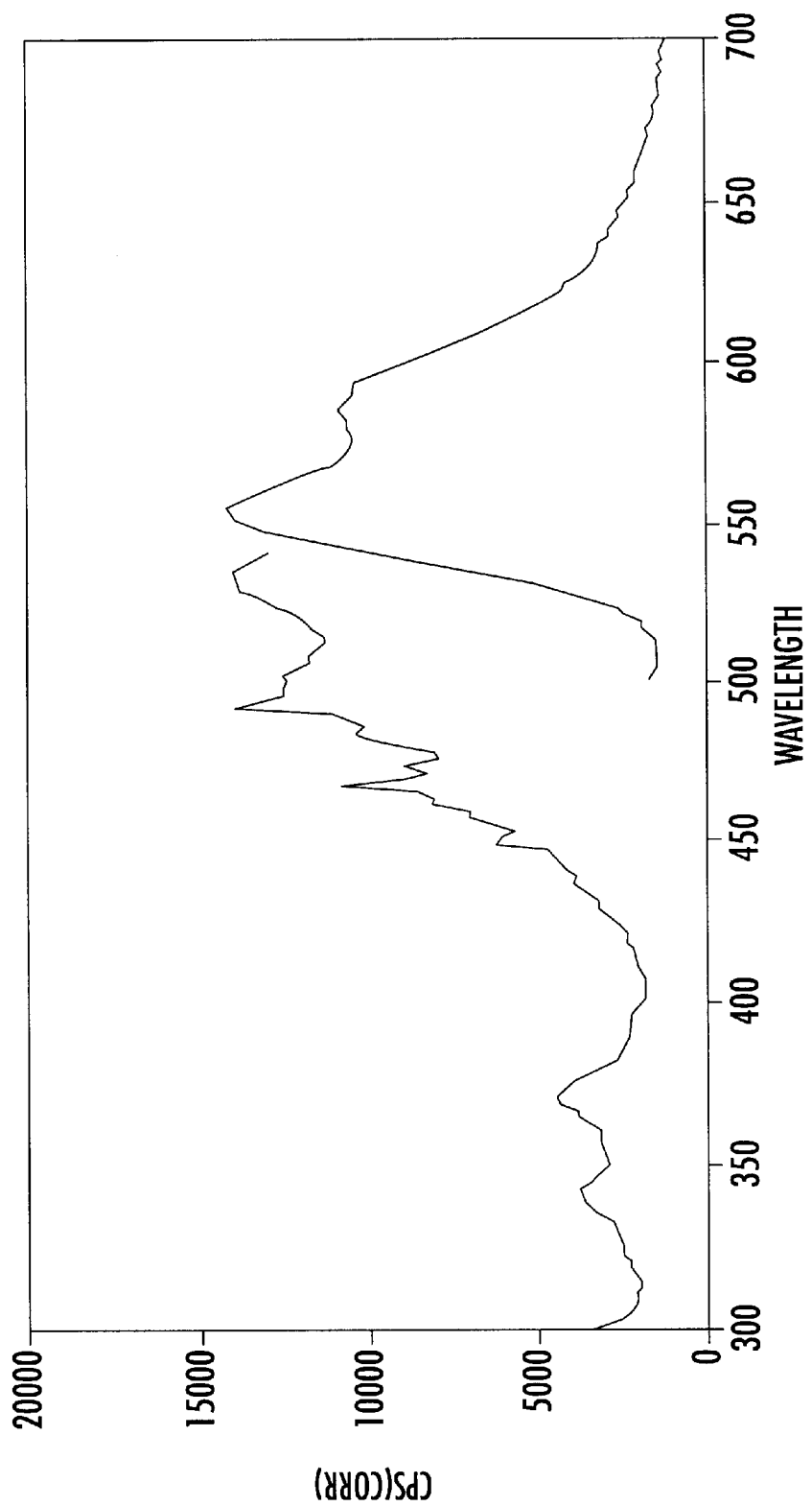
FIG. 10 is a graph of wavelength in nanometers (nm) versus whole numbers in counts per second (cps) for a nylon-6 fiber comprising 0.1% by weight of Pigment Violet 19 and 1% by weight of SANDUVOR® VSU, wherein the fiber was prepared from a masterbatch without NYLOSTAB® S-EED™ (in contrast to FIG. 9).
Figure 11:
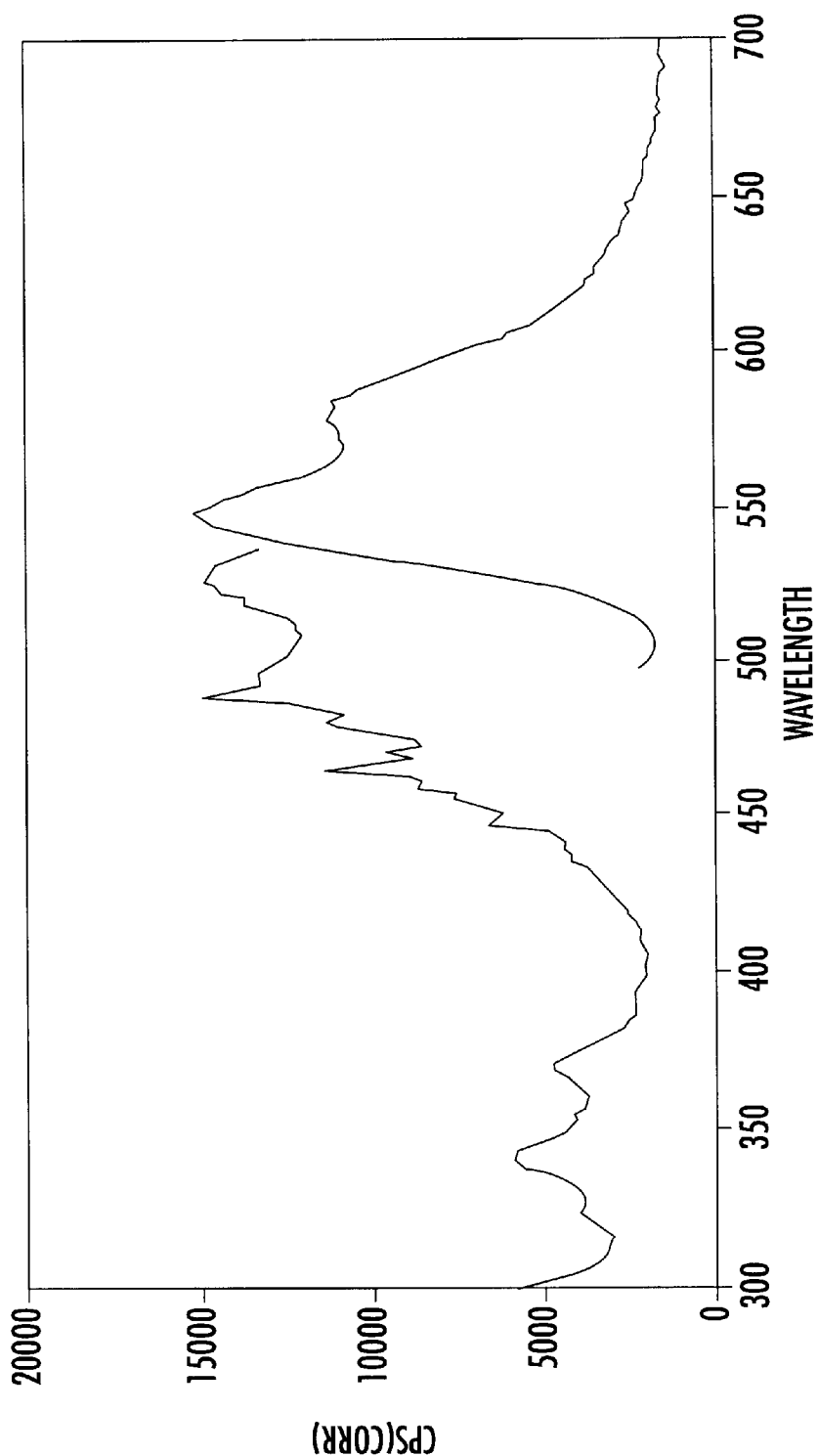
FIG. 11 is a graph of wavelength in nanometers (nm) versus whole numbers in counts per second (cps) for a nylon-6 fiber comprising 0.1% by weight of Pigment Violet 19 and 0.5% by weight of SANDUVOR® PR25.
Figure 12:
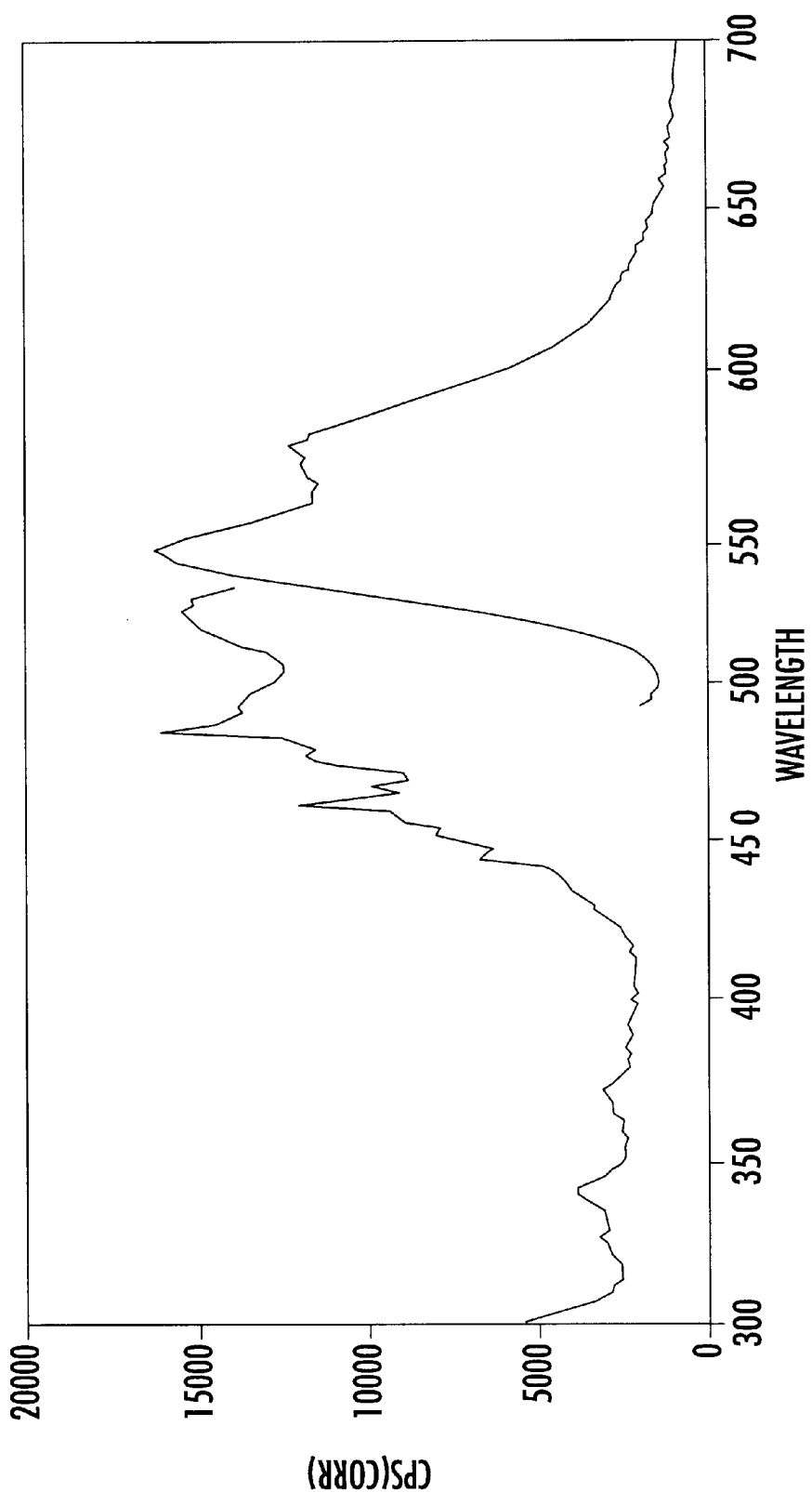
FIG. 12 is a graph of wavelength in nanometers (nm) versus whole numbers in counts per second (cps) for a nylon-6 fiber comprising 0.1% by weight of Pigment Violet 19 and 0.5% by weight of SANDUVOR® 3035.
Figure 13:
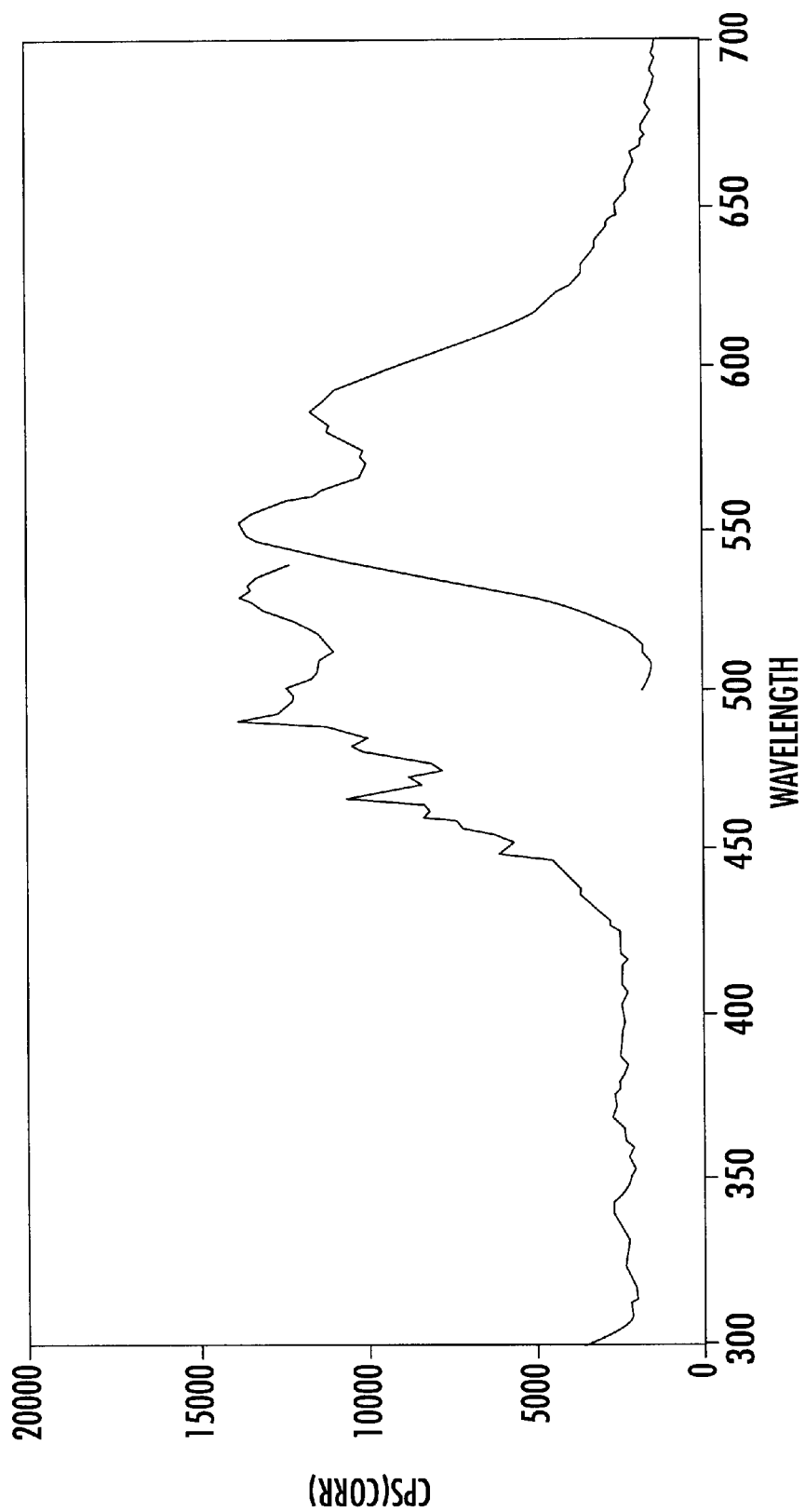
FIG. 13 is a graph of wavelength in nanometers (nm) versus whole numbers in counts per second (cps) for a nylon-6 fiber comprising 0.1% by weight of Pigment Violet 19 and 1% by weight of SANDUVOR® 3035.

FIG. 3 which is a graph of wavelength in nm versus relative intensity illustrates the exposure of card wraps of polyamide fiber comprising Pigment Violet 19 to ultraviolet light after 100 hours in a QUV340 device versus the reverse side of the card wraps which were exposed to heat at 70° C. but unexposed to light. The side of the card wrap exposed to ultraviolet light had lower relative intensity as compared to the reverse side of the card wrap that was not exposed to ultraviolet light but only to the heat of the QUV unit which was set at 70° C. The data showed that light has a major effect on lowering the fluorescence and heat had a minor effect.

Example 8

This example relates to the effect of polar and nonpolar soluble UV absorbers alone and in combination with non-UV absorbing HALS compounds on the fluorescence of Pigment Violet 19 in polyamide. UV absorber masterbatches were prepared on a 30 mm twin screw extruder at 260° C. in a nylon-6 carrier commercially available from DSM. The UV absorber masterbatches were let down in a 25% by weight single pigment concentrate of Pigment Violet 19 in a nylon-6 carrier and fibers were prepared at 260° C. for testing. Card wraps comprising 0.1% by weight of Pigment Violet 19 and various ultraviolet absorbers and concentrations thereof were exposed using QLV340 exposure and fluorescence data was measured. Fluorescence spectroscopy was run in non-relative intensity mode for this experiment. Whole numbers were compared in counts per second (cps). These values reflected the true fluorescence for each card wrap and were to be used for comparison with all other samples in this series as set forth in FIGS. 4 to 13.

Example 9

In this example, 25% single pigment concentrates of Pigment Violet 19 in nylon-6 carriers were prepared with and without UV absorbers. The percentage of Pigment Violet 19 used was such that there would be 0.1% pigment in the final fiber. The effect of various UV absorbers on the degree of fluorescence was measured and photographed under black light. A control was prepared which was a 25% single pigment concentrate of Pigment Violet 19. No UV absorber was added. The control emitted a fluorescence of 15,500 cps. Next, a 25% single pigment concentrate of Pigment Violet 19 was prepared and a second masterbatch of 1% by weight of SANDUVOR® VSU in a nylon-6 carrier was prepared. These masterbatches were added together, and formed into a fiber. The card wraps of resulting fiber emitted a fluorescence of 14,500 cps. Yet again, a first masterbatch was prepared from a 25% single pigment concentrate of Pigment Violet 19 with 3% by weight of NYLOSTAB® S-EED™ and a second masterbatch was prepared comprising 1% by weight of SANDUVOR® VSU. These masterbatches were added together and formed into a fiber. The card wraps of the resulting fiber emitted a fluorescence of 17,000 cps. It was observed that the optimum method for obtaining maximum fluorescence was to combine the UV absorber together with the pigment in the same masterbatch such that they were in intimate contact. It was also observed that adding the UV absorber to a masterbatch other than the pigment resulted in fluorescence but the degree of fluorescence was not as great.

Example 10

A trial was conducted, the results of which are shown in Table 1, comparing the color space of the polyamide fiber with 0.1% by weight of Pigment Violet 19 and having varying amounts of NYLOSTAB® S-EED™ in the final fiber. A 25% by weight single pigment concentrate of Pigment Violet 19 was used to color the fiber. In the tables below, $\Delta L^*$ represents difference in lightness/darkness value; "+" is lighter and "−" is darker, $\Delta a^*$ represents difference on red/green axis; "+" is redder and "−" is greener, $\Delta b^*$ represents difference on yellow/blue axis; "+" is yellower and "−" is bluer, $\Delta C^*$ represents difference in chroma; "+" is brighter and "−" is duller, $\Delta H^*$ represents difference in hue, and $\Delta E^*ab$ represents total color difference value.

TABLE 1

|  | $\Delta L^*$ | $\Delta a^*$ | $\Delta b^*$ | $\Delta C^*$ | $\Delta H^*$ | $\Delta E^*ab$ |
|---|---|---|---|---|---|---|
| 1.5% NYLOSTAB S-EED | 2.65 | −1.53 | 2.36 | −0.56 | 2.76 | 3.87 |
| 3.0% NYLOSTAB S-EED | 2.25 | −0.88 | 2.25 | −0.01 | 2.41 | 3.30 |
| 5.0% NYLOSTAB S-EED | 3.50 | −1.98 | 4.52 | −0.07 | 4.93 | 6.05 |

A trial was conducted, the results of which are shown in Table 2, comparing the color space of the polyamide fiber with 0.25% by weight of Pigment Violet 19 and having varying amounts of NYLOSTAB® S-EED™ in the final fiber.

TABLE 2

|  | $\Delta L^*$ | $\Delta a^*$ | $\Delta b^*$ | $\Delta C^*$ | $\Delta H^*$ | $\Delta E^*ab$ |
|---|---|---|---|---|---|---|
| 1.5% NYLOSTAB S-EED | −1.65 | 1.30 | 0.38 | 1.35 | 0.17 | 2.14 |

A trial was conducted, the results of which are shown in Table 3, comparing the color space of the polyamide fiber with 1% by weight of Pigment Violet 19 and having varying amounts of NYLOSTAB® S-EED™ in the final fiber.

TABLE 3

|  | $\Delta L^*$ | $\Delta a^*$ | $\Delta b^*$ | $\Delta C^*$ | $\Delta H^*$ | $\Delta E^*ab$ |
|---|---|---|---|---|---|---|
| 1.5% NYLOSTAB S-EED | 0.31 | 0.30 | −0.04 | 0.28 | −0.11 | 0.44 |
| 3.0% NYLOSTAB S-EED | 0.16 | 0.65 | −0.12 | 0.60 | −0.29 | 0.68 |
| 5.0% NYLOSTAB S-EED | −0.10 | 0.78 | 0.38 | 0.85 | 0.15 | 0.87 |

Example 11

Hot melt smear tests were conducted with 25% single pigment concentrates of Pigment Violet 19 in nylon-6, without and without the presence of NYLOSTAB® S-EED™. A hot plate was used to heat the concentrates. The concentrates were smeared on a glass microscope slide to form a melt smear. The microscope slide was placed under a transmission microscope at a magnification of 200×. The results were observed. In the smear comprising the NYLOSTAB® S-EED™, the pigment was completely dispersed in the nylon 6 as evidenced by the uniform red color of the pigment. In contrast, in the smear without NYLOSTAB® S-EED™, the pigment was not uniformly distributed in the nylon 6 as evidenced by the dark, non-uniform spots in the red color of the pigment.

Example 12

Single pigment concentrates of Pigment Yellow 192 in nylon-6 carriers were prepared. A control was prepared without the presence of NYLOSTAB® S-EED™. A single pigment concentrate was prepared with a 50:50 blend of Pigment Yellow 192 and NYLOSTAB® S-EED™ and achieved 0.1% by weight of Pigment Yellow 192 and 0.1% by weight of NYLOSTAB® S-EED™ in the final polyamide fiber. Another masterbatch was prepared with a 60:40 blend of Pigment Yellow 192 and NYLOSTAB® S-EED™ and achieved 0.1% by weight of Pigment Yellow 192 and 0.067% NYLOSTAB® S-EED™ in the final polyamide fiber. The fluorescence of the fibers that were prepared from each of said masterbatches was observed visually and photographed under black light.

Comparative Example 1

25% single pigment concentrates of Pigment Violet 19 in a nylon-6 carrier were prepared with and without the presence of UV absorbers. The weight percentage of Pigment Violet 19 used was such that there would be 0.1% pigment in the final fiber based upon the weight of the polyamide. The effect of various UV absorbers on the degree of fluorescence was measured and photographed under black light. A control was prepared which was a 25% single pigment concentrate of Pigment Violet 19. No UV absorber was added. Fluorescence was observed. A 25% single pigment concentrate of Pigment Violet 19 was prepared and another masterbatch of 10% SANDUVOR® 3035 in a nylon-6 carrier was prepared such that the final fiber would have 0.5% SANDUVOR® 3035. Another 25% single pigment concentrate of Pigment Violet 19 was prepared and a second masterbatch of 10% SANDUVOR® 3035 in a nylon-6 carrier was prepared such that the final fiber would have 1% SANDUVOR® 3035. The fiber with 0.5% of SANDUVOR® 3035 in the final fiber had a visibly quenched fluorescence. The fiber with 1% of SANDUVOR® 3035 in the final fiber had a visibly quenched fluorescence.

Comparative Example 2

A study was conducted between fiber having a concentration of 0.1% by weight of Pigment Violet 19 and fiber having a concentration of 0.1% by weight of Pigment Red 122 to compare their fluorescence. Pigment Red 122 (CAS Registry No. 980-26-7); TSCA Inventory Name: Quino[2,3-b]acridine-7,14-dione, 5,12-dihydro-2,9-dimethyl-) is a quinacridone pigment having the following structure:

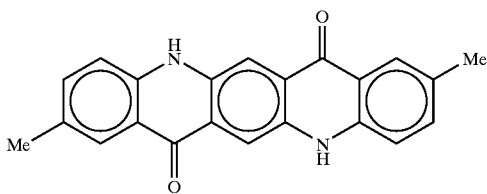

A single pigment concentrate of Pigment Red 122 was prepared without any NYLOSTAB® S-EED™ as a control. Single pigment concentrates of Pigment Red 122 were prepared with 1.5% by weight, 3% by weight and 5% by weight of NYLOSTAB® S-EED™, respectively. A single pigment concentrate of Pigment Violet 19 was prepared without any NYLOSTAB® S-EED™ as a control. A single pigment concentrate of Pigment Violet 19 was also prepared with 5% by weight of NYLOSTAB® S-EED™. The results of this comparison are shown in FIGS. 15–19. The fiber comprising Pigment Violet 19 exhibited fluorescence while the fiber comprising the Pigment Red 122 did not.

Comparative Example 3

A trial was conducted, the results of which are shown in Table 4, comparing the color space of polyamide fiber with 0.1% by weight of Pigment Red 122 having varying amounts of NYLOSTAB® S-EED™ in the final fiber. A 25% by weight of single pigment concentrate of Pigment Red 122 was used to color the fiber. In the tables below, ΔL* represents difference in lightness/darkness value; "+" is lighter and "−" is darker,
Δa* represents difference on red/green axis; "+" is redder and "−" is greener,
Δb* represents difference on yellow/blue axis; "+" is yellower and "−" is bluer,
ΔC* represents difference in chroma; "+" is brighter and "−" is duller,
ΔH* represents difference in hue, and
ΔE*ab represents total color difference value.

TABLE 4

|  | ΔL* | Δa* | Δb* | ΔC* | ΔH* | ΔE*ab |
|---|---|---|---|---|---|---|
| 1.5% NYLOSTAB S-EED | −1.67 | 1.48 | −0.02 | 1.41 | 0.46 | 2.23 |
| 3.0% NYLOSTAB S-EED | −1.73 | 1.62 | −0.14 | 1.58 | 0.39 | 2.37 |
| 5.0% NYLOSTAB S-EED | 1.10 | −0.12 | −0.01 | −0.11 | −0.05 | 1.10 |

A trial was conducted, the results of which are shown in Table 5, comparing the color space of polyamide fiber with 0.25% Pigment Red 122 and with varying amount of NYLOSTAB® S-EED™ in final fiber.

TABLE 5

|  | ΔL* | Δa* | Δb* | ΔC* | ΔH* | Δ*ab |
|---|---|---|---|---|---|---|
| 3% NYLOSTAB S-EED | −1.38 | 1.66 | −0.45 | 1.72 | 0.09 | 2.21 |

A trial was conducted, the results of which are shown in Table 6, comparing the color space of polyamide fiber with 1% by weight of Pigment Red 122 having varying amounts of NYLOSTAB® S-EED™ in the final fiber.

TABLE 6

|  | ΔL* | Δa* | Δb* | ΔC* | ΔH* | ΔE*ab |
|---|---|---|---|---|---|---|
| 1.5% NYLOSTAB S-EED | −2.18 | 0.35 | 2.62 | 0.01 | 2.65 | 3.43 |
| 3.0% NYLOSTAB S-EED | −2.96 | 0.77 | 3.03 | 0.39 | 3.11 | 4.30 |
| 5.0% NYLOSTAB S-EED | −1.93 | 0.76 | 2.15 | 0.47 | 2.24 |  |

A color space comparison of the results with Pigment Violet 19 versus the results with Pigment Red 122 demonstrated that although the color strength of Pigment Red 122 was greater than Pigment Violet 19, the Pigment Red 122 did not exhibit fluorescence as did the Pigment Violet 19.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A fluorescent pigment composition comprising:
a) a polyamide, and
b) a pigment of formula (Ib)

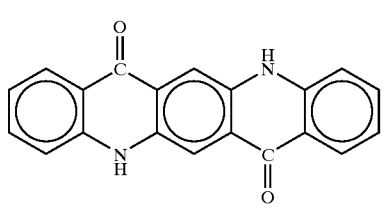

in an amount of less than one percent by weight, wherein the percent by weight is based upon the weight of the polyamide, wherein the polyamide and the pigment of formula (Ib) are in the form of a dry mixture.

2. The fluorescent pigment composition as claimed in claim 1, wherein the amount of the pigment of the formula (Ib) is 0.005 to 0.25 percent by weight.

3. The fluorescent pigment composition as claimed in claim 1, wherein the amount of the pigment of the formula (Ib) is 0.01 to 0.15 percent by weight.

4. The fluorescent pigment composition as claimed in claim 1, further comprising a compound of formula (II)

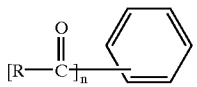
(II)

wherein

R is a sterically hindered amino group adjacent to the carbonyl carbon, and n is 1, 2, 3, or 4.

5. The fluorescent pigment composition as claimed in claim 4, wherein in the compound of the formula (II), n=2 and R is

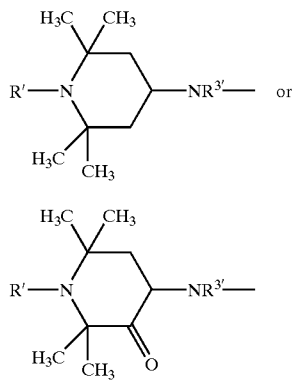

(III)

or (IV)

wherein for either the formula (III) or the formula (IV): R' is independently either hydrogen, $C_1$–$C_{20}$ alkyl, O, OH, $CH_3$, CN, an acetyl group, $C_1$–$C_{18}$ alkoxy, alkoxyalkylenoxyalky, $C_5$–$C_{12}$ cycloalkoxy, $C_3$–$C_6$ alkenyl, $C_7$–$C_9$ phenylalkyl unsubstituted or mono-, di- or tri-substituted on the phenyl by $C_1$–$C_4$ alkyl; or aliphatic or aromatic $C_1C_{10}$ acyl, —$COR^{4'}$ (where $R^{4'}$ is hydrogen, $C_1$–$C_6$ alkyl, phenyl, and —$C_1$–$C_{20}$ COO(H or $C_1$–$C_4$ alkyl)), $C_1$–$C_{20}$ alkylamino, optionally further substituted $C_1$–$C_{20}$ alkoxyalkyl, $C_1$–$C_{20}$ hydroxyalkyl, $C_1$–$C_{20}$ alkenyl, substituted $C_1$–$C_{20}$ alkenyl groups, $C_1$–$C_{20}$-alkoxy-$C_1$–$C_{20}$-alkyl groups, $C_1$–$C_{20}$-oxy-N—$C_1$–$C_{20}$-alkyl groups, —N-cyclic-$C_1$–$C_{10}$-alkyl groups, and cyclic-N—$C_1$–$C_{10}$-alkyl groups-$COR^{4'}$ (where $R^{4'}$ is hydrogen, $C_1$–$C_6$ alkyl, phenyl, and —$C_1$–$C_{20}$ COO(H or $C_1$–$C_4$ alkyl)); and $R^{3'}$ is hydrogen or $C_1$–$C_8$ alkyl.

6. The fluorescent pigment composition as claimed in claim 4, wherein the compound of the formula (II) is selected from the group consisting of:

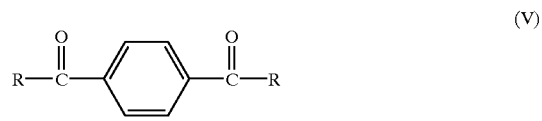
(V)

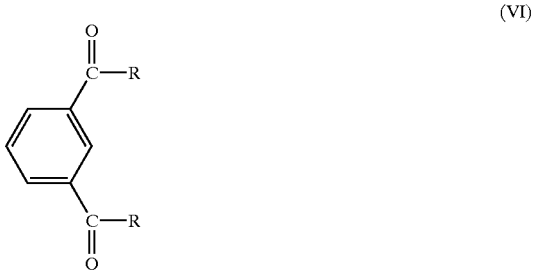
(VI)

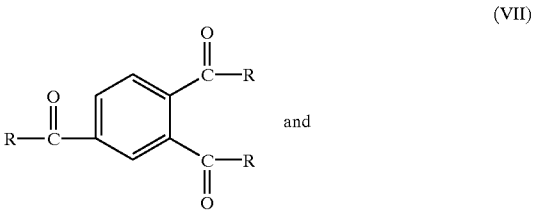
(VII)

and

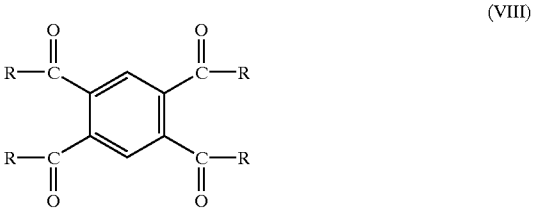
(VIII)

wherein R is a sterically hindered amino group adjacent to the carbonyl carbon.

7. The fluorescent pigment composition as claimed in claim 4, wherein the compound of the formula (II) is present in an amount of 0.05 to 20 percent by weight, wherein the percent by weight is based upon the weight of the polyamide.

8. The fluorescent pigment composition as claimed in claim 4, wherein in the compound of the formula (II), R is

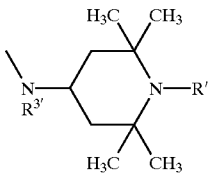

wherein R' is hydrogen, $C_1$–$C_{20}$ alkyl, O, OH, $CH_3$, CN, an acetyl group, $C_1$–$C_{18}$ alkoxy, alkoxyalkylenoxyalky, $C_5$–$C_{12}$ cycloalkoxy, $C_3$–$C_6$ alkenyl, $C_7$–$C_9$ phenylalkyl unsubstituted or mono-, di- or tri-substituted on the phenyl by $C_1$–$C_4$ alkyl; or aliphatic or aromatic $C_1$–$C_{10}$ acyl, —$COR^{4'}$ (where $R^{4'}$ is hydrogen, $C_1$–$C_6$ alkyl, phenyl, and —$C_1$–$C_{20}$ COO(H or $C_1$–$C_4$ alkyl)), $C_1$–$C_{20}$ alkylamino, optionally further substituted $C_1$–$C_{20}$ alkoxyalkyl, $C_1$–$C_{20}$ hydroxyalkyl, $C_1$–$C_{20}$ alkenyl, substituted $C_1$–$C_{20}$ alkenyl groups, $C_1$–$C_{20}$-alkoxy-$C_1$–$C_{20}$-alkyl groups, $C_1$–$C_{20}$-oxy-N—$C_1$–$C_{20}$-alkyl groups, —N-cyclic-$C_1$–$C_{10}$-alkyl groups, and cyclic-N—$C_1$–$C_{10}$-alkyl groups-$COR^{4'}$ (where $R^{4'}$ is hydrogen, $C_1$–$C_6$ alkyl, phenyl, and —$C_1$–$C_{20}$ COO(H or $C_1$–$C_4$ alkyl)); and wherein $R^{3'}$ is hydrogen or $C_1$–$C_8$ alkyl.

9. The fluorescent pigment composition as claimed in claim 1, further comprising a non-inhibiting UV absorber.

10. The fluorescent pigment composition as claimed in claim 9, wherein the non-inhibiting UV absorber has a wavelength of less than about 370 nm.

11. The fluorescent pigment composition as claimed in claim 9, wherein the non-inhibiting UV absorber has an absorptivity from about 25 L/(g·cm) to about 200 L/(g·cm).

12. The fluorescent pigment composition as claimed in claim 9, wherein the non-inhibiting UV absorber is selected from the group consisting of oxanilides, benzyl malonates, salicylates, cinnamates, and triazines.

13. A fluorescent pigment composition comprising:
a) a polyamide,
b) a pigment of formula (Ib)

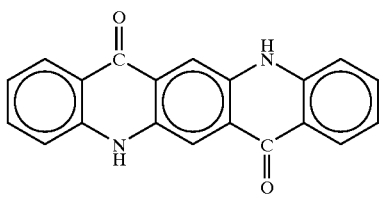

(Ib)

in an amount of less than one percent by weight, and c) a compound of the formula (XIII)

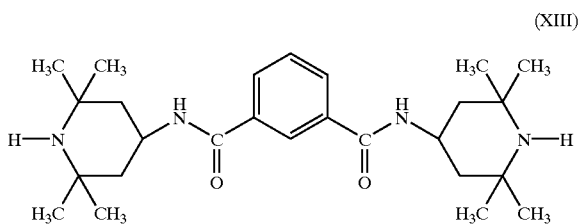

(XIII)

wherein the polyamide, the pigment of formula (Ib) and the compound of the formula (XIII) are in the form of a dry mixture.

14. The fluorescent pigment composition as claimed in claim 13, wherein the compound of the formula (XIII) is present in an amount of 0.05 to 20 percent by weight, wherein the percent by weight is based upon the weight of the polyamide.

15. An article comprising:
a) a polyamide, and
b) a pigment of formula (Ib)

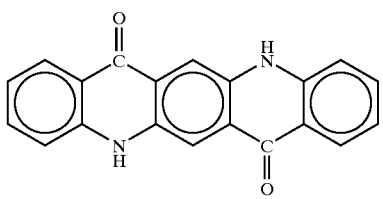

(Ib)

in an amount of less than one percent by weight, wherein the percent by weight is based upon the weight of the polyamide, wherein the polyamide and the pigment of formula (Ib) are melt processed.

16. The article as claimed in claim 15, further comprising a compound of the formula (II)

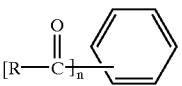

(II)

wherein
R is a sterically hindered amino group adjacent to the carbonyl carbon, and
n is 1, 2, 3, or 4.

17. The article as claimed in claim 16, wherein the compound of the formula (II) is present in an amount of 0.05 to 20 percent by weight, wherein the percent by weight is based upon the weight of the polyamide.

18. The article as claimed in claim 16, wherein in the compound of the formula (II), R is

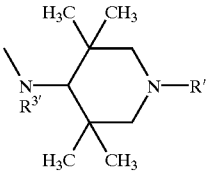

wherein R' is hydrogen, $C_1$–$C_{20}$ alkyl, O, OH, $CH_3$, CN, an acetyl group, $C_1$–$C_{18}$ alkoxy, alkoxyalkylenoxyalky, $C_5$–$C_{12}$ cycloalkoxy, $C_3$–$C_6$ alkenyl, $C_7$–$C_9$ phenylalkyl unsubstituted or mono-, di- or tri-substituted on the phenyl by $C_1$–$C_4$ alkyl; or aliphatic or aromatic $C_1$–$C_{10}$ acyl, —$COR^{4'}$ (where $R^{4'}$ is hydrogen, $C_1$–$C_6$ alkyl, phenyl, and —$C_1$–$C_{20}$ COO(H or $C_1$–$C_4$ alkyl)), $C_1$–$C_{20}$ alkylamino, optionally further substituted $C_1$–$C_{20}$ alkoxyalkyl, $C_1$–$C_{20}$ hydroxyalkyl, $C_1$–$C_{20}$ alkenyl, substituted $C_1$–$C_{20}$ alkenyl groups, $C_1$–$C_{20}$-alkoxy-$C_1$–$C_{20}$-alkyl groups, $C_1$–$C_{20}$-oxy-N—$C_1$–$C_{20}$-alkyl groups, —N-cyclic-$C_1$–$C_{10}$-alkyl groups, and cyclic-N—$C_1$–$C_{10}$-alkyl groups-$COR^{4'}$ (where $R^{4'}$ is hydrogen, $C_1$–$C_6$ alkyl, phenyl, and —$C_1$–$C_{20}$ COO(H or $C_1$–$C_4$ alkyl)); and $R^{3'}$ is hydrogen or $C_1$–$C_8$ alkyl.

19. The article as claimed in claim 15, further comprising a non-inhibiting UV absorber.

20. The article as claimed in claim 19, wherein the non-inhibiting UV absorber has a wavelength of less than about 370 nm.

21. The article as claimed in claim 19, wherein the non-inhibiting UV absorber has an absorptivity from about 25 L/(g·cm) to about 200 L/(g·cm).

22. The article as claimed in claim 19, wherein the non-inhibiting UV absorber is selected from the group consisting of oxanilides, benzyl malonates, salicylates, cinnamates, and triazines.

23. An article comprising:
a) a polyamide,
b) a pigment of formula (Ib)

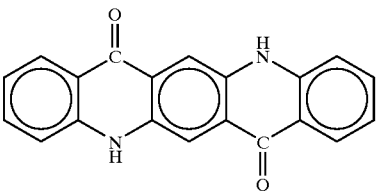

(Ib)

in an amount of less than one percent by weight, wherein the percent by weight is based upon the weight of the polyamide, and c) a compound of the formula (XIII)

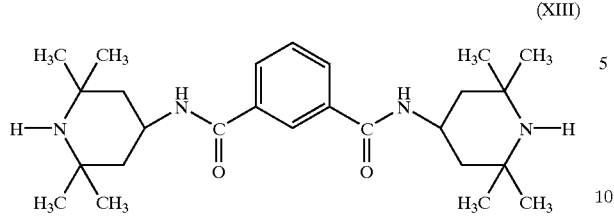

wherein the polyamide, the pigment of formula (Ib) and the compound of the formula (XIII) are melt processed.

24. The article as claimed in claim 23, wherein the compound of the formula (XIII) is present in an amount of 0.05 to 20 percent by weight, wherein the percent by weight is based upon the weight of the polyamide.

25. A fluorescent pigment composition comprising:
 a) a polyamide, and
 b) a pigment of formula (Ia)

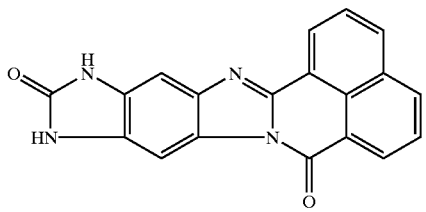

in an amount of less than one percent by weight, wherein the percent by weight is based upon the weight of the polyamide, wherein the polyamide and the pigment of formula (Ia) are in the form of a dry mixture.

26. The fluorescent pigment composition as claimed in claim 25, wherein the amount of the pigment of the formula (Ia) is 0.005 to 0.25 percent by weight.

27. The fluorescent pigment composition as claimed in claim 26, wherein the amount of the pigment of the formula (Ia) is 0.01 to 0.15 percent by weight.

28. The fluorescent pigment composition as claimed in claim 25, further comprising:
 a compound of the formula (II)

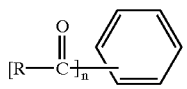

wherein
 R is a sterically hindered amino group adjacent to the carbonyl carbon, and
 n is 1, 2, 3, or 4.

29. The fluorescent pigment composition as claimed in claim 28, wherein the compound of the formula (II) is present in an amount of 0.05 to 20 percent by weight based upon the weight of the polyamide.

30. The fluorescent pigment composition as claimed in claim 28, wherein in the compound of the formula (II), n=2 and R is

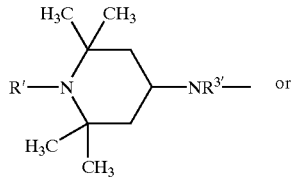

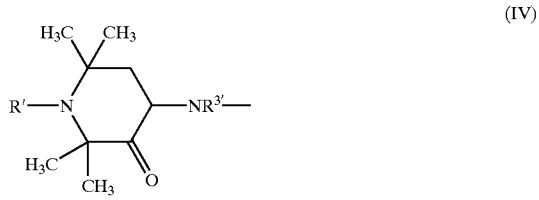

wherein for either the formula (III) or the formula (IV): R' is independently either hydrogen, $C_1$–$C_{20}$ alkyl, O, OH, $CH_3$, CN, an acetyl group, $C_1$–$C_{18}$ alkoxy, alkoxyalkylenoxyalky, $C_5$–$C_{12}$ cycloalkoxy, $C_3$–$C_6$ alkenyl, $C_7$–$C_9$ phenylalkyl unsubstituted or mono-, di- or tri-substituted on the phenyl by $C_1$–$C_4$ alkyl; or aliphatic or aromatic $C_1$–$C_{10}$ acyl, —$COR^{4'}$ (where $R^{4'}$ is hydrogen, $C_1$–$C_6$ alkyl, phenyl, and —$C_1$–$C_{20}$ COO(H or $C_1$–$C_4$ alkyl)), $C_1$–$C_{20}$ alkylamino, optionally further substituted $C_1$–$C_{20}$ alkoxyalkyl, $C_1$–$C_{20}$ hydroxyalkyl, $C_1$–$C_{20}$ alkenyl, substituted $C_1$–$C_{20}$ alkenyl groups, $C_1$–$C_{20}$-alkoxy-$C_1$–$C_{20}$-alkyl groups, $C_1$–$C_{20}$-oxy-N—$C_1$–$C_{20}$-alkyl groups, —N-cyclic-$C_1$–$C_{10}$-alkyl groups, and cyclic-N—$C_1$–$C_{10}$-alkyl groups-$COR^{4'}$ (where $R^{4'}$ is hydrogen, $C_1$–$C_6$ alkyl, phenyl, and —$C_1$–$C_{20}$ COO(H or $C_1$–$C_4$ alkyl)); and $R^{3'}$ is hydrogen or $C_1$–$C_8$ alkyl.

31. The fluorescent pigment composition as claimed in claim 28, wherein the compound of the formula (II) is selected from the group consisting of:

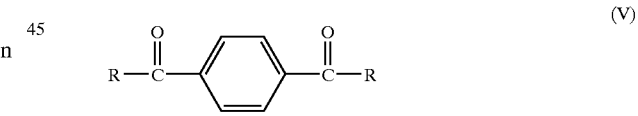

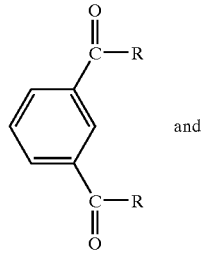

and

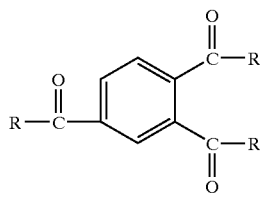

-continued (VII)

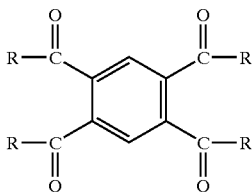

wherein R is a sterically hindered amino group adjacent to the carbonyl carbon.

32. The fluorescent pigment composition as claimed in claim 28, wherein in the compound of the formula (II), R is

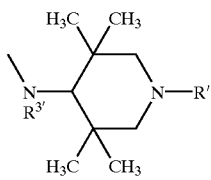

wherein R' is hydrogen, $C_1$–$C_{20}$ alkyl, O, OH, $CH_3$, CN, an acetyl group, $C_1$–$C_{18}$ alkoxy, alkoxyalkylenoxyalky, $C_5$–$C_{12}$ cycloalkoxy, $C_3$–$C_6$ alkenyl, $C_7$–$C_9$ phenylalkyl unsubstituted or mono-, di- or tri-substituted on the phenyl by $C_1$–$C_4$ alkyl; or aliphatic or aromatic $C_1$–$C_{10}$ acyl, —$COR^{4'}$ (where $R^{4'}$ is hydrogen, $C_1$–$C_6$ alkyl, phenyl, and —$C_1$–$C_{20}$ COO(H or $C_1$–$C_4$ alkyl)), $C_1$–$C_{20}$ alkylamino, optionally further substituted $C_1$–$C_{20}$ alkoxyalkyl, $C_1$–$C_{20}$ hydroxyalkyl, $C_1$–$C_{20}$ alkenyl, substituted $C_1$–$C_{20}$ alkenyl groups, $C_1$–$C_{20}$-alkoxy-$C_1$–$C_{20}$-alkyl groups, $C_1$–$C_{20}$-oxy-N—$C_1$–$C_{20}$-alkyl groups, —N-cyclic-$C_1$–$C_{10}$-alkyl groups, and cyclic-N—$C_1$–$C_{10}$-alkyl groups-$COR^{4'}$ (where $R^{4'}$ is hydrogen, $C_1$–$C_6$ alkyl, phenyl, and —$C_1$–$C_{20}$ COO(H or $C_1$–$C_4$ alkyl)); and wherein $R^{3'}$ is hydrogen or $C_1$–$C_8$ alkyl.

33. The fluorescent pigment composition as claimed in claim 25, further comprising a non-inhibiting UV absorber.

34. The fluorescent pigment composition as claimed in claim 33, wherein the non-inhibiting UV absorber has a wavelength of less than about 370 nm.

35. The fluorescent pigment composition as claimed in claim 33, wherein the non-inhibiting UV absorber has an absorptivity from about 25 L/(g·cm) to about 200 L/(g·cm).

36. The fluorescent pigment composition as claimed in claim 33, wherein the non-inhibiting UV absorber is selected from the group consisting of oxanilides, benzyl malonates, salicylates, cinnamates, and triazines.

37. A fluorescent pigment composition comprising:
a) a polyamide,
b) a pigment of formula (Ia)

(Ia)

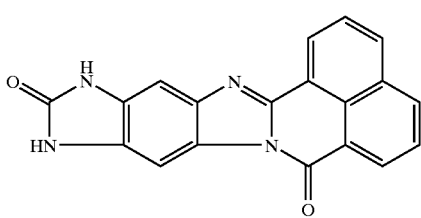

in an amount of less than one percent by weight, wherein the percent by weight is based upon the weight of the polyamide, and c) a compound of the formula (XIII)

(XIII)

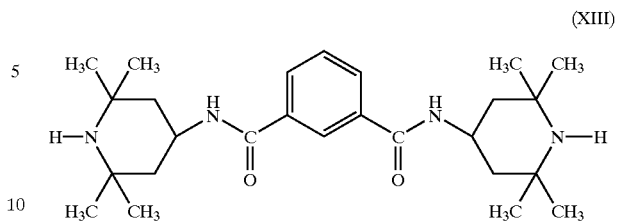

wherein the polyamide, the pigment of formula (Ia) and the compound of the formula (XIII) are in the form of a dry mixture.

38. The fluorescent pigment composition as claimed in claim 37, wherein the compound of the formula (XIII) is present in an amount of 0.05 to 20 percent by weight, wherein the percent by weight is based on the weight of the polyamide.

39. An article comprising
a) a polyamide, and
b) a pigment of formula (Ia)

(Ia)

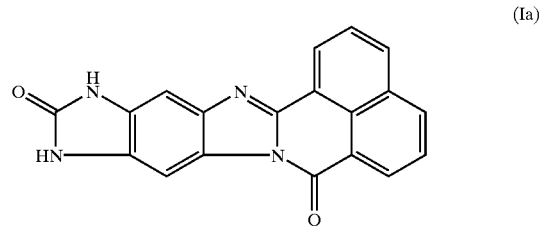

in an amount of less than one percent by weight, wherein the percent by weight is based upon the weight of the polyamide, wherein the polyamide, and the pigment of formula Ia) are melt processed.

40. The article as claimed in claim 39, further comprising a compound of the formula (II)

(II)

wherein
R is a sterically hindered amino group adjacent to the carbonyl carbon, and
n is 1, 2, 3, or 4.

41. The article as claimed in claim 40, wherein the compound of the formula (II) is present in an amount of 0.05 to 20 percent by weight, wherein the percent by weight is based on the weight of the polyamide.

42. The article as claimed in claim 40, wherein in the compound of the formula (II), R is

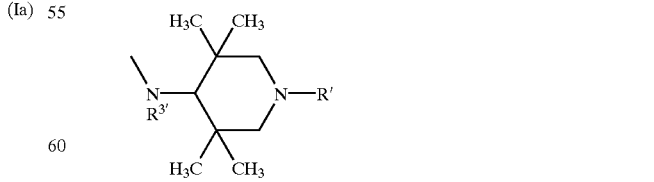

wherein R' is hydrogen, $C_1$–$C_{20}$ alkyl, O, OH, $CH_3$, CN, an acetyl group, $C_1$–$C_{18}$ alkoxy, alkoxyalkylenoxyalky, $C_5$–$C_{12}$ cycloalkoxy, $C_3$–$C_6$ alkenyl, $C_7$–$C_9$ phenylalkyl unsubstituted or mono-, di- or tri-substituted on the phenyl by $C_1$–$C_4$ alkyl; or aliphatic or aromatic $C_1$–$C_{10}$ acyl, —$COR^{4'}$ (where $R^{4'}$ is hydrogen, $C_1$–$C_6$ alkyl, phenyl, and —$C_1$–$C_{20}$ COO(H or $C_1$–$C_4$ alkyl)), $C_1$–$C_{20}$ alkylamino, optionally further substituted $C_1$–$C_{20}$ alkoxyalkyl, $C_1$–$C_{20}$ hydroxyalkyl, $C_1$–$C_{20}$ alkenyl, substituted $C_1$–$C_{20}$ alkenyl groups, $C_1$–$C_{20}$-alkoxy-$C_1$–$C_{20}$-alkyl groups, $C_1$–$C_{20}$-oxy-N—$C_1$–$C_{20}$-alkyl groups, —N-cyclic-$C_1$–$C_{10}$-alkyl groups, and cyclic-N—$C_1$–$C_{10}$-alkyl groups-$COR^{4'}$ (where $R^{4'}$ is hydrogen, $C_1$–$C_6$ alkyl, phenyl, and —$C_1$–$C_{20}$ COO(H or $C_1$–$C_4$ alkyl)); and $R^{3'}$ is hydrogen or $C_1$–$C_8$ alkyl.

43. An article comprising:
a) a polyamide,
b) a pigment of formula (Ia)

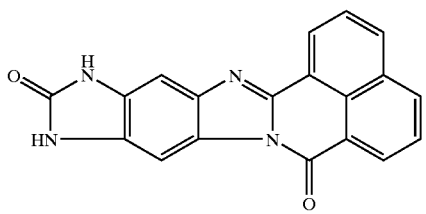

(Ia)

in an amount of less than one percent by weight, wherein the percent by weight is based upon the weight of the polyamide, and
c) a compound of the formula (XIII)

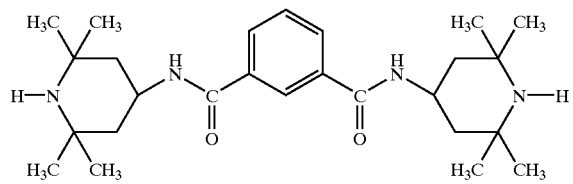

wherein the polyamide, the pigment of formula (Ia) are melt processed and the compound of formula (XIII) are melt processed.

44. The article as claimed in claim 43, wherein the compound of the formula (XIII) is present in an amount of 0.05 to 20 percent by weight, wherein the percent by weight is based upon the weight of the polyamide.

45. A process of preparing a fluorescent pigment composition, the process comprising:
a) incorporating a compound of formula (Ia)

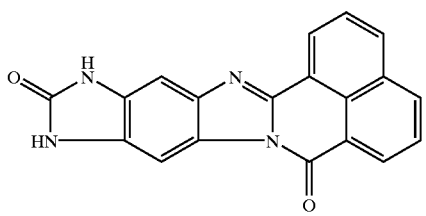

(Ia)

or a compound of formula (Ib)

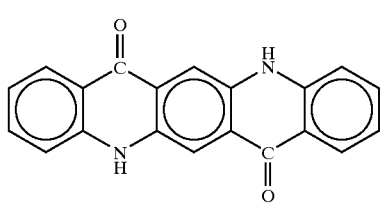

(Ib)

in a carrier polymer to form a masterbatch, and
b) melt processing the masterbatch with a polyamide to form the fluorescent pigment composition.

46. The process as claimed in claim 45, further comprising adding an additive to the masterbatch.

47. The process as claimed in claim 45, further comprising forming the fluorescent pigment composition into an article.

48. The process as claimed in claim 47, wherein the article is molded, cast, or extruded.

49. The process as claimed in claim 47, wherein the additive is present in the article in an amount of about 0.001% to 0.03% by weight based upon the weight of the article.

50. The process as claimed in claim 49, wherein the additive is present in the article in an amount of about 0.005% to 0.03% by weight based upon the weight of the article.

51. The process as claimed in claim 46, wherein the additive is a non-inhibiting UV absorber having a wavelength of less than about 370 nm.

52. The process as claimed in claim 46, wherein the additive is a compound of the formula (XIII)

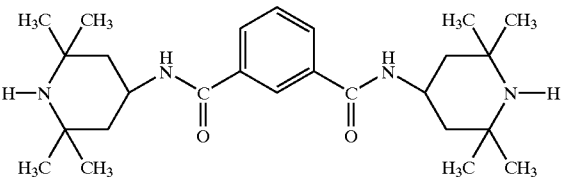

53. The process as claimed in claim 45, further comprising preparing a second masterbatch comprised of an additive in a carrier polymer and adding the second masterbatch to the polyamide.

54. A process of preparing a fluorescent pigment composition, the process comprising:
a) physically mixing an additive with a compound of the formula (Ia)

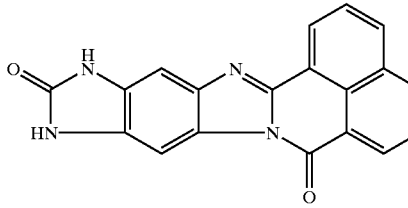

(Ia)

or a compound of the formula (Ib)

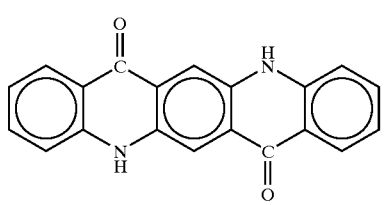

(Ib)

to form a dry physical mixture, b) adding the dry physical mixture to a polyamide to form the fluorescent pigment composition.

55. The process as claimed in claim 54, wherein the compound of the formula (Ia) or the compound of the formula (Ib) is mixed with the additive in a ratio of compound to additive of 50:50.

56. The process as claimed in claim 54, wherein the compound of the formula (Ia) or the compound of the formula (Ib) is mixed with the additive in a ratio of compound to additive of 60:40.

57. The process as claimed in claim 54, wherein the compound of the formula (Ia) or the compound of the formula (Ib) is mixed with the additive in a ratio of compound to additive of 40:60.

58. The process as claimed in claim 54, wherein the compound of the formula (Ia) or the compound of the formula (Ib) is mixed with the additive in a ratio of compound to additive of 70:30.

59. The process as claimed in claim 54, wherein the compound of the formula (Ia) or the compound of the formula (Ib) is mixed with the additive in a ratio of compound to additive of 30:70.

60. The process as claimed in claim 54, wherein the additive is a non-inhibiting UV absorber having a wavelength of less than about 370 nm.

61. The process as claimed in claim 54, wherein the additive is a compound of formula (XIII)

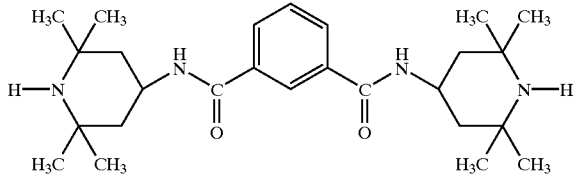

62. The process as claimed in claim 54, further comprising forming the fluorescent pigment composition into an article.

63. The process as claimed in claim 62, wherein the article is molded, cast, or extruded.

64. The process as claimed in claim 62, wherein the additive is present in the article in an amount of about 0.001% to 0.03% by weight based upon the weight of the article.

65. The process as claimed in claim 64, wherein the additive is present in the article in an amount of about 0.005% to 0.03% by weight based upon the weight of the article.

66. A process of preparing a fluorescent pigment composition, the process comprising:

a) obtaining a masterbatch comprising a compound of formula (Ia)

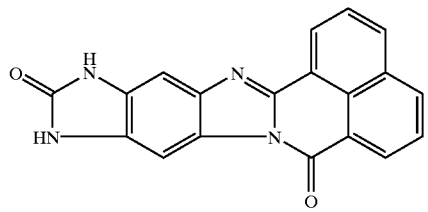

or a compound of formula (Ib)

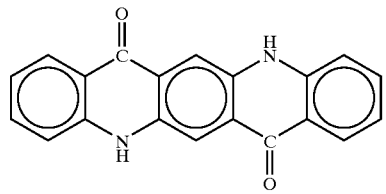

b) obtaining a masterbatch comprising an additive, c) letting down the masterbatches independently, and d) adding the masterbatches to a polyamide to form a fluorescent pigment composition.

67. The process as claimed in claim 66, further comprising forming the fluorescent pigment composition into an article.

68. The process as claimed in claim 67, wherein the article is molded, cast, or extruded.

69. The process as claimed in claim 66, wherein the additive is a compound of formula (XIII):

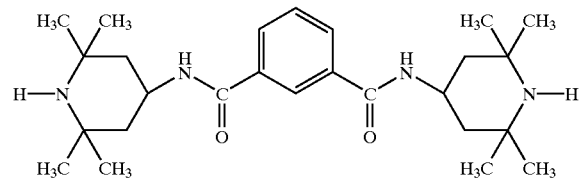

70. The process as claimed in claim 67, wherein the additive is present in the article in an amount of about 0.01% to 0.4% by weight based upon the weight of the article.

71. The process as claimed in claim 70, wherein the additive is present in the article in an amount of about 0.05% to 0.3% by weight based upon the weight of the article.

72. A process for making a fluorescent pigment composition comprising the step of adding a compound of formula (Ia)

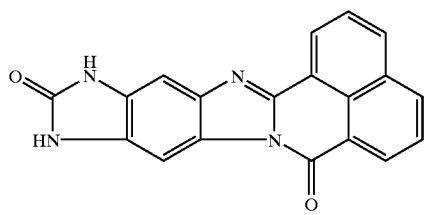

or a compound of formula (Ib)

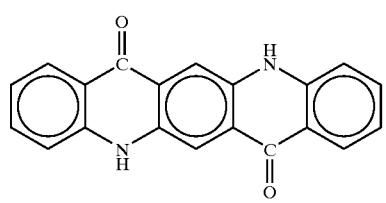

into molten polyamide.

* * * * *